US012273699B2

(12) United States Patent
Chou

(10) Patent No.: US 12,273,699 B2
(45) Date of Patent: *Apr. 8, 2025

(54) AUDIO SYSTEM WITH DYNAMIC TARGET LISTENING SPOT AND AMBIENT OBJECT INTERFERENCE CANCELATION

(71) Applicant: Realtek Semiconductor Corp., Hsinchu (TW)

(72) Inventor: Kai-Hsiang Chou, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 303 days.

This patent is subject to a terminal disclaimer.

(21) Appl. No.: 17/993,512

(22) Filed: Nov. 23, 2022

(65) Prior Publication Data

US 2023/0188923 A1   Jun. 15, 2023

Related U.S. Application Data

(60) Provisional application No. 63/287,986, filed on Dec. 10, 2021, provisional application No. 63/321,770, filed on Mar. 20, 2022.

(30) Foreign Application Priority Data

Aug. 13, 2022  (TW) .................................. 111130512

(51) Int. Cl.
*H04S 7/00*       (2006.01)
*G06F 3/01*       (2006.01)
(Continued)

(52) U.S. Cl.
CPC .............. *H04S 7/303* (2013.01); *G06F 3/011* (2013.01); *G06F 3/165* (2013.01); *H04R 3/12* (2013.01); *H04R 2430/20* (2013.01)

(58) Field of Classification Search
CPC .......... H04S 7/303; G06F 3/011; G06F 3/165; H04R 3/12; H04R 2430/20
See application file for complete search history.

(56) References Cited

U.S. PATENT DOCUMENTS

| | | | |
|---|---|---|---|
| 2014/0328505 A1* | 11/2014 | Heinemann | G06F 3/012 381/303 |
| 2015/0168542 A1 | 6/2015 | Parhizkar et al. | |
| 2015/0208188 A1 | 7/2015 | Carlsson et al. | |

FOREIGN PATENT DOCUMENTS

| | | |
|---|---|---|
| CN | 106105271 A | 11/2016 |
| CN | 111050269 A | 4/2020 |
| WO | WO2015/142868 A1 | 9/2015 |

OTHER PUBLICATIONS

Taiwanese Notice of Allowance for Taiwanese Application No. 111130512, dated Mar. 4, 2024, with an English translation.
(Continued)

*Primary Examiner* — Carolyn R Edwards
*Assistant Examiner* — Dylan Maguire Neece
(74) *Attorney, Agent, or Firm* — Birch, Stewart, Kolasch & Birch, LLP

(57) ABSTRACT

An audio system is proposed, dynamically playing optimized audio signals based on user position. A sensor circuits dynamically senses a target space to generate field context information. First speaker and second speaker are arranged for audio playback. A host device recognizes a user from the field context information, determines the user position corresponding to the target space, and adaptively assigns the user position as a target listening spot. A sensor circuit contains a camera capturing an ambient image out of the target space. A recognizer circuit analyzes the ambient image to obtain from the target space, the location, size, and acoustic attribute information of an ambient object, allowing the control circuit to accordingly perform a channel-based (Continued)

compensation operation on the target listening spot to generate optimized first channel audio signal and second channel audio signal.

9 Claims, 13 Drawing Sheets

(51) Int. Cl.
    *G06F 3/16*     (2006.01)
    *H04R 3/12*     (2006.01)

(56)     References Cited

OTHER PUBLICATIONS

Taiwanese Office Action and Search Report for corresponding Taiwanese Application No. 111130512, dated Jun. 29, 2023, with English translation.
Taiwanese Office Action and Search Report for corresponding Taiwanese Application No. 111130513, dated Jun. 8, 2023, with English translation.
Taiwanese Office Action and Search Report for corresponding Taiwanese Application No. 111130514, dated Jun. 8, 2023, with English translation.
Taiwanese Office Action and Search Report for corresponding Taiwanese Application No. 111130515, dated Jun. 8, 2023, with English translation.

\* cited by examiner

AUDIO SYSTEM WITH DYNAMIC TARGET LISTENING SPOT AND AMBIENT OBJECT INTERFERENCE CANCELATION

CROSS-REFERENCE TO RELATED APPLICATIONS

This application claims the benefit of priority to U.S. Provisional Application Ser. No. 63/287,986, filed on Dec. 10, 2021; the entirety of which is incorporated herein by reference for all purposes.

This application claims the benefit of priority to U.S. Provisional Application Ser. No. 63/321,770, filed on Mar. 20, 2022; the entirety of which is incorporated herein by reference for all purposes.

This application claims the benefit of priority to patent application No. 111130512, filed in Taiwan on Aug. 13, 2022; the entirety of which is incorporated herein by reference for all purposes.

BACKGROUND

The disclosure generally relates to audio processing technology, and particularly, to an audio system dynamically adjusting playback effects according to live conditions in a sound field space.

A conventional audio system comprises a plurality of speaker layouts around a target space to form a surround sound field environment. Each speaker is arranged to individually output corresponding channel audio. When a surround sound field environment is configured, the installer of the audio system generally presumes a middle area of the target space to be the optimal listening spot, and based on which, multiple speakers are configured. When multiple speakers are operated to simultaneously play multiple audio channels, the users sitting around the optimal listening spot are expected to experience immersive listening effects.

In practical environments, however, the user's listening experience is vulnerable to numerous factors. For example, in a traditional audio system, the range of the optimal listening spot is zone-limited. When the user moves to an area other than the optimal listening spot, although the multi-channel audio output of the audio system can still be heard, the listening effect of the multi-channel audio received at the user's position may have been greatly reduced or completely invalidated. In addition, the room layout, furniture position, and materials in the target space are all ambient objects that may affect the listening experience. For example, sofas, windows, and curtains may absorb or reflect a portion of the sound energy, distorting the individual channels of audio received at the optimal listening spot.

In other words, conventional audio systems cannot dynamically adjust the position of the optimal listening spot, and the users are forced to restrict their movement to accommodate the position of the optimal listening spot, causing a lot of inconvenience. On the other hand, individual channel audio can be distorted by interference from ambient objects, further limiting or even neutralizing the availability of the optimal listening spot. As a result, the soundstage environment built with excessive cost may fail its purpose.

SUMMARY

In view of this, it is therefore desirable to find out how to make the audio system dynamically adjust the optimal listening spot with user movements to eliminate the interference of ambient objects in the target space.

The present specification provides an embodiment of an audio system, arranged to dynamically optimize playback effects according to a user position, comprising a sensor circuit, a first speaker, and a host device. The sensor circuit is arranged to dynamically sense a target space to generate field context information. The first speaker and a second speaker are arranged to play sound. The host device is coupled to the sensor circuit, the first speaker, and the second speaker, comprising a recognizer circuit, a control circuit, and an audio transmission circuit. The recognizer circuit is arranged to identify a user from the field context information and determine the user position in the target space. The control circuit is coupled to the recognizer circuit, arranged to dynamically assign the user position as a target listening spot. The audio transmission circuit is coupled to the control circuit, the first speaker, and the second speaker, arranged to transmit audio signals. Wherein, the sensor circuit comprises a camera arranged to capture an ambient image of the target space. Wherein, the recognizer circuit analyzes the ambient image to obtain spatial configuration information and acoustic attribute information of an ambient object in the target space. Wherein, the control circuit performs a channel-based compensation operation based on the target listening spot, the spatial configuration information, and the acoustic attribute information of the ambient object to render a first channel audio signal and a second channel audio signal optimized for the target listening spot. Wherein, the control circuit respectively outputs the first channel audio signal and the second channel audio signal through the audio transmission circuit to the first speaker and the second speaker.

Another aspect of the invention provides an embodiment of an audio system, arranged to dynamically optimize playback effects according to a user position, comprising a sensor circuit, a first speaker, and a host device. The sensor circuit is arranged to dynamically sense a target space to generate field context information. The first speaker and a second speaker are arranged to play sound. The host device is coupled to the sensor circuit, the first speaker, and the second speaker, comprising a recognizer circuit, a control circuit, and an audio transmission circuit. The recognizer circuit is arranged to identify a user from the field context information and determine the user position in the target space. The control circuit is coupled to the recognizer circuit, arranged to dynamically assign the user position as a target listening spot. The audio transmission circuit is coupled to the control circuit, the first speaker, and the second speaker, arranged to transmit audio signals. Wherein, the sensor circuit comprises a camera arranged to capture an ambient image of the target space. Wherein, the recognizer circuit analyzes the ambient image to obtain spatial configuration information and acoustic attribute information of an ambient object in the target space. Wherein, the control circuit maps the target space to an object-based space, and accordingly generates a compensatory audio object in the object-based space based on the ambient object. Wherein, metadata of the compensatory audio object comprises: the spatial configuration information and the acoustic attribute information of the ambient object. Wherein, the control circuit performs an object-based compensation operation based on the target listening spot and the metadata, to cancel interferences imposed on the target listening spot caused by the ambient object and generate a first channel audio signal and a second channel audio signal optimized for the target listening spot. Wherein, the control circuit respectively outputs the first channel audio signal and the second channel audio signal through the audio transmission circuit to the first speaker and the second speaker.

A further aspect of the invention provides an embodiment of an audio system arranged to dynamically optimize playback effects according to a user position, comprising a sensor circuit, a first speaker, and a host device. The sensor circuit is arranged to dynamically sense a target space to generate field context information. The first speaker and a second speaker are arranged to play sound. The host device is coupled to the sensor circuit, the first speaker, and the second speaker, comprising a recognizer circuit, a control circuit, an audio transmission circuit, and a user interface circuit. The recognizer circuit is arranged to identify a user from the field context information and determine the user position in the target space. The control circuit is coupled to the recognizer circuit, arranged to dynamically assign the user position as a target listening spot. The audio transmission circuit is coupled to the control circuit, the first speaker, and the second speaker, arranged to transmit audio signals. The user interface circuit is coupled to the control circuit, arranged to be controlled by the control circuit to run a configuration program and obtain spatial configuration information and acoustic attribute information of an ambient object in the target space. Wherein, the control circuit performs a channel-based compensation operation based on the target listening spot, the spatial configuration information, and the acoustic attribute information of the ambient object to render a first channel audio signal and a second channel audio signal optimized for the target listening spot. Wherein, the control circuit respectively outputs the first channel audio signal and the second channel audio signal through the audio transmission circuit to the first speaker and the second speaker.

A further aspect of the invention provides an embodiment of an audio system arranged to dynamically optimize playback effects according to a user position, comprising a sensor circuit, a first speaker, and a host device. The sensor circuit is arranged to dynamically sense a target space to generate field context information. The first speaker and a second speaker are arranged to play sound. The host device is coupled to the sensor circuit, the first speaker, and the second speaker, comprising a recognizer circuit, a control circuit, an audio transmission circuit, and a user interface circuit. The recognizer circuit is arranged to identify a user from the field context information and determine the user position in the target space. The control circuit is coupled to the recognizer circuit, arranged to dynamically assign the user position as a target listening spot. The audio transmission circuit is coupled to the control circuit, the first speaker, and the second speaker, arranged to transmit audio signals. The user interface circuit is coupled to the control circuit, arranged to be controlled by the control circuit to run a configuration program and obtain spatial configuration information and acoustic attribute information of an ambient object in the target space. Wherein, the control circuit maps the target space to an object-based space, and accordingly generates a compensatory audio object in the object-based space based on the ambient object. Wherein, metadata of the compensatory audio object comprises: the spatial configuration information and the acoustic attribute information of the ambient object. Wherein, the control circuit performs an object-based compensation operation based on the target listening spot and the metadata, to cancel interferences imposed on the target listening spot caused by the ambient object and generate a first channel audio signal and a second channel audio signal optimized for the target listening spot. Wherein, the control circuit respectively outputs the first channel audio signal and the second channel audio signal through the audio transmission circuit to the first speaker and the second speaker.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
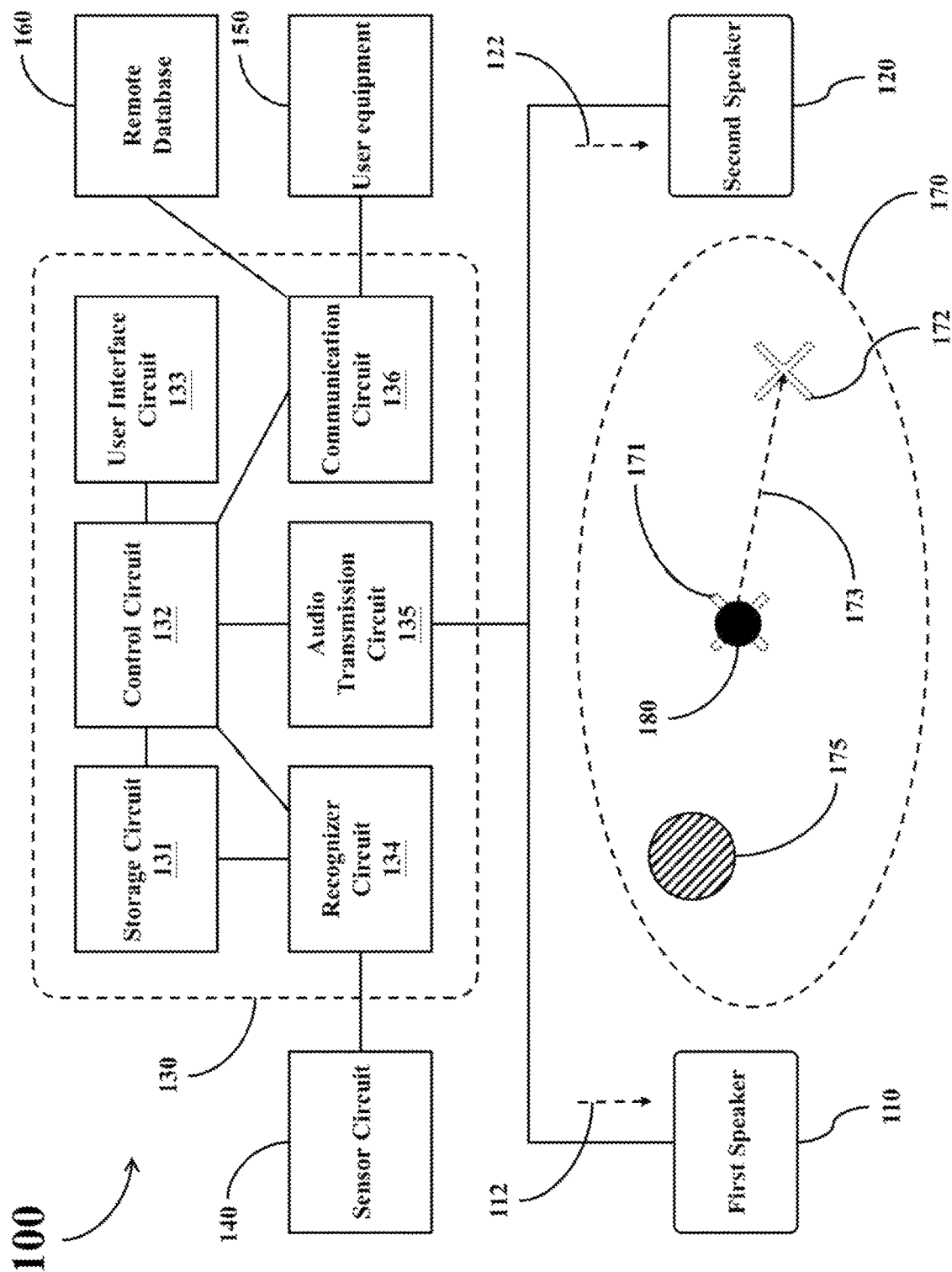
FIG. 1 shows a functional block diagram of the audio system according to an embodiment of the present invention.

FIG. 1 shows a functional block diagram of the audio system according to an embodiment of the present invention.

The audio system 100 mainly comprises a host device 130 and a plurality of speakers. The host device 130 may control a plurality of speakers while playing audio. The host device 130 may be a computer host, a barebones system, an embedded system, or a customized digital audio processing device. The host device 130 comprises a communication circuit 136, so that the host device 130 may communicate with a user device 150 with wire or wirelessly, which serves as an input channel for audio signals or data.

The user device 150 may be a mobile phone, a computer, a television stick, a game console, or other audio source providing device, providing music or sound streaming to the host device 130 through the communication circuit 136. Furthermore, the audio system 100 may use the communication circuit 136 to work in conjunction with the user device 150 or other multimedia devices to form a home theater system having both video functions and audio functions. For example, the target space 170 may further comprise a projection screen, a screen or display (not drawn), controlled by the user device 150 to display. For example, the user device 150 may be a headset-mounted virtual reality device. The user 180 may stand in the target space 170 and see the picture through the user device 150, and the host device 130 may be controlled by the user device 150. The audio is played synchronously with the screen play. The communication circuit 136 in the embodiment, may be, but is not limited to, a high-definition multimedia interface (HDMI), Sony/Philips Digital Interface Format (SPDIF), wireless LAN modules, Ethernet modules, shortwave RF transceivers, or an evolutionary application of Bluetooth Low Energy (BLE) version 4 or version 5, or the universal serial bus.

The host device 130 further comprises an audio transmission circuit 135 for connecting a plurality of speakers, and respectively outputs a plurality of channels of audio to make the speaker play. The host device 130 controls a plurality of speakers through the audio transmission circuit 135, which may be a one-way digital or analog output, or a two-way synchronous communication protocol. The connection between the audio transmission circuit 135 and each speaker, may be a wired interface, a wireless interface, or a mixture of both applications. The wired interface may be, but is not limited to, a composite audio-visual terminal, a digital transmission interface, or a high-quality multimedia interface. The wireless interface may be, but is not limited to, a wireless area network, a shortwave RF transceiver, or an evolved application of Bluetooth Low Energy Version 4 or Version 5. In a further derived embodiment, since the audio transmission circuit 135 and the communication circuit 136 are both interfaces connected to external components in functional positioning, in the derived implementations, they may be combined to become a multifunctional bidirectional transmission interface module. The audio transmission circuit 135 and the communication circuit 136 employ a variety of known telecommunication standards to achieve connection and transmission between components, which may increase forward compatibility for the audio system 100, and reduce the replacement cost when the component is damaged.

The target space 170 in FIG. 1 may be understood as a three-dimensional stereoscopic space for the user 180 to use the sound system 100. Each of the speakers may be allocated at separate locations in the target space 170, respectively playing one of a plurality of audio channels. A plurality of speakers around the configuration, can create a surround sound field environment in a target space 170. There are many standard specifications defining the number of speakers and how they are configured. For example, a 5.1-channel surround sound system consists of two front-facing speakers, a center speaker, two surround speakers, and a subwoofer, jointing creating a surround sound field space that surrounds a target listening point, and together plays sound to that target listening point. In a 7.1-channel surround sound system, a pair of rear surround speakers are further configured behind the target listening point to provide a more stereo soundstage. In recent years, new specifications such as 5.1.2 channels and 7.2.2 channels have emerged, including more speakers and direction-specific channel configurations, which can achieve more realistic "panoramic sound", "sky sound" or "floor sound". In the embodiments, to facilitate the description of the technical features of the sound system 100, only the first speaker 110 and the second speaker 120 are depicted in FIG. 1 as representatives. Wherein, the first speaker 110 receives and plays the first channel audio 112 provided by the host device 130, and the second speaker 120 receives and plays the second channel audio 122 provided by the host device 130. It must be understood that, in practice, the sound system 100 of the embodiment is not limited to the application of only two speakers, but may be applied to 2.1 channels, 4.1 channels, 5.1 channels, 7.2 channels or more channel specification configuration. Each speaker in the target space 170 may have a different audio output specification. For example, some speakers are good at producing bass effects, and some are good at producing mid-to-high notes. The host device 130 may deploy a sound field of various environmental characteristics in accordance with different speaker specifications in the target space 170.

The term "audio channel" elaborated in the specification and the scope of the patent application generally refers to physical channel and logical channel. A logic channel is referred to as audio data streams transmitted within the system, while a physical channel is referred to as the signal source played by a speaker. In the embodiment, the first channel audio signal 112 and the second channel audio signal 122 played by respective speakers are physical channels, which may be down-mix results from one or more logical channels. For example, a pair of headphones has only two speakers, but can hear the sound produced by multiple applications at the same time. In other words, the sound effects data of multiple applications can be down-mixed by the system into two physical channels and respectively played as audible sounds through the two speakers. That is, the first channel audio signal 112 and the second channel audio signal 122 in the embodiment are not limited to be audio signals of a single logic channel, but may be down-mixed results from a plurality of logic channels synthesized with appropriate ratios.

In FIG. 1, the first speaker 110 and the second speaker 120 are configured on both sides of a target space 170, play sounds toward a target listening spot in the target space 170. The target listening spot may be understood as a position of the audio system 100 where the received playback effect is optimized. In some audio systems, the target listening spot is also called the listening sweet spot. In most cases, the target listening spot is typically located in a specific region of the target space 170, such as a center point, axis, tangent plane, or the equal loudness center of a plurality of speakers. In FIG. 1, the first location 171 where the user 180 is located, represents the target listening spot of the target space 170. When the user 180 moves from the first location 171 along the movement trajectory 173 to the second location 172, the user 180 is far away from the first speaker 110 and gets close to the second speaker 120, and therefore the listening effect received by the user 180 is biased. Conventionally, an audio system is unable to track the movement of the user 180 to correspondingly adjust the listening effect received at second location 172. The embodiments of proposed solutions in the invention will be described in detail later.

On the other hand, the target space 170 typically contains some ambient object 175, such as sofa, table, window, wall, ceiling, or floor. These ambient objects 175 produce different degrees of interference effects to the sound played by the first speaker 110 and the second speaker 120 depending on varied materials, sizes and positions. For example, a cloth sofa or window may absorb sound, and marble floors or walls may reflect sound. In other words, the presence of an ambient object 175 may affect the listening experience of the first channel audio signal 112 and the second channel audio signal 122 at the target listening spot. Conventionally, an audio system is incapable of identifying ambient objects 175 in the target space 170, nor does it have the function to compensate the first channel audio signal 112 and the second channel audio signal 122 according to the size, material, position of the ambient objects 175. The audio system 100 of the embodiment is arranged to calculate and eliminate interferences caused by the ambient objects 175 of the target space 170 by compensating the first channel audio signal 112 and the second channel audio signal 122. For ease of illustration, only one ambient object 175 is depicted in FIG. 1 of the embodiment to illustrate how the audio system 100 operates. However, it must be understood that the target space 170 of FIG. 1 is not used to limit only one ambient object 175. Solutions to the interference of ambient object 175 will be described in greater detail later.

The host device 130 of the embodiment further comprises a storage circuit 131. The storage circuit 131 may comprise a non-volatile memory device for storing an operating system, and application software or firmware required for operating the host device 130. The storage circuit 131 may also contain a volatile memory device for use as an operational storage for the control circuit 132. The host device 130 of the embodiment further comprises a control circuit 132. The control circuit 132 may be a central processing unit, a digital signal processor, or a microcontroller. The control circuit 132 may read from the memory circuit 131 a pre-stored operating system, software, or firmware, to control the host device 130, the first speaker 110 and the second speaker 120 to perform audio playback operations. Furthermore, the host device 130 of the embodiment uses the control circuit 132 to perform a series of sound field compensation operations to dynamically optimize the playback effect, to solve the shortcomings that the conventional audio system cannot overcome.

To dynamically optimize the playback effect at the target listening spot, the audio system 100 of the embodiment comprises a sensor circuit 140, arranged to dynamically sense a target space 170 and respectively generate field context information. The sensor circuit 140 may be a component located outside the host device 130 and coupled to the host device 130. The sensor circuit 140 may be a camera 610, an infrared sensor 620, a wireless detector 630, or a combination of one or more thereof. The field context information captured by the sensor circuit 140 may comprise diverse types of information depending on different implementations of the sensor circuit 140. For example, the field context information may include images of the user and ambient objects, pictures, thermal imaging, radio wave imaging, or a combination of one or more thereof. In one embodiment, the sensor circuit 140 is disposed around the target space 170. To be noted, although FIG. 1 only depicts a sensor circuit 140, the audio system 100 in practice, may comprise multiple sets of sensor circuits 140, respectively allocated in various positions around the target space 170 to obtain sound field context information with better accuracy.

The host device 130 of the embodiment may further comprise a recognizer circuit 134 coupled to the sensor circuit 140. The recognizer circuit 134 may identify from the field context information the key information affecting the sound field, allowing the control circuit 132 to dynamically adjust the first channel audio signal 112 and the second channel audio signal 122 played from the first speaker 110 and the second speaker 120. For example, the recognizer circuit 134 may identify a user from the field context information and determine the user's position in the target space. Since the field context information provided by the sensor circuit 140 may comprise a variety of combinations in diverse types, the recognizer circuit 134 may be correspondingly implemented to adapt respective identification technology or solutions. For example, when the field context information is an image, the recognizer circuit 134 may employ artificial intelligence (AI) identification technology to distinguish the user in an image. Through the application of artificial intelligence, after identifying the user in the image 134, the user head, face, and even ear position can be further located. If the sensor circuit 140 is capable of providing diversified information such as a three-dimensional image with a spatial depth, infrared thermal imaging, or wireless signals, the recognizer circuit 134 can be leveraged to render more accurate identification results.

To calculate the degree of interference caused by the ambient object 175 to the sound field environment, the host device 130 requires the spatial configuration information and acoustic attribute information of the ambient object 175. The spatial configuration information may include the size of the ambient object 175, position, shape, and various appearance characteristics. The acoustic attribute information can include material-related characteristics such as acoustic absorption rate, reflectivity of sound, and resonance frequency of sound. In one embodiment, when the recognizer circuit 134 identifies the field context information, the recognizer circuit 134 may further identify spatial configuration information of the ambient object 175 in the target space 170 out of the field context information, and accordingly lookup the acoustic attribute information. To identify ambient objects 175, an object database is required. In one embodiment, the storage circuit 131 in the host device 130 may also be used to store an object database. The object database may contain information about various appearance characteristics used to identify the ambient object 175, as well as various acoustic attribute information corresponding to each ambient object 175. For example, when the host device 130 needs to calculate the degree of interferences to the sound field environment caused by an ambient object 175, the recognizer circuit 134 first determines the object name of the ambient object 175, and then the host device 130 reads the storage circuit 131 to find the acoustic absorption rate and reflectivity of sound corresponding to the ambient object 175.

In practice, the recognizer circuit 134 may be a customized processor chip, performing the artificial intelligence identification function cooperated with the existing operating system, software or firmware stored in the storage circuit 131. The recognizer circuit 134 may also be implemented as one of the cores or threads in the control circuit 132, performing predetermined artificial intelligence software products in the storage circuit 131 to achieve the identification functions. The recognizer circuit 134 may also be a memory module storing a particular artificial intelligence software product, and the identification function is completed by execution of the product in the control circuit 132.

The user interface circuit 133 in the host device 130 can be used by the user to control the operation of the host device 130. The user interface circuit 133 may include a display screen, button, turntable, or touch screen, allowing the user to perform basic audio system 100 control functions, such as adjusting the volume, playback, fast-forward, and backwards. In one embodiment, the control circuit 132 may also perform a configuration program through the user interface circuit 133 for the user to set various sound field scenarios, or the target space 170 in the ambient object 175 spatial configuration information to the host device 130. For example, in the configuration program, the control circuit 132 uses the user interface circuit 133 to receive object configuration data entered by the user, such as object name, type, size and location of one or more ambient objects 175. After obtaining the spatial configuration information in the control circuit 132, the corresponding acoustic absorption rate and reflectivity of sound are looked up from the object database stored in the storage circuit 131, so that the subsequent sound field compensation operation is performed. In a further derived embodiment, the user interface circuit 133 may also be provided by the user device 150. The user may operate the configuration program using the user device 150, and finally the user device 150 transmits the configured settings to the control circuit 132 through the communication circuit 136.

The host device 130 may also be connected to a remote database 160 via a communication circuit 136. In a further embodiment, the object database implemented by the storage circuit 131 may also be implemented by a remote database 160. When the host device 130 needs to calculate the degree of interference caused by an ambient object 175 to the sound field environment, the field context information may first be obtained by the recognizer circuit 134 to be analyzed, and thereafter, the communication circuit 136 is used to access the remote database 160, allowing an ambient object 175 to be found that matches the characteristics of the ambient object 175, and thus the sound field attribute information of the ambient object 175 is obtained. The remote database 160 may be a server located in the cloud or other system, coupled to the host device 130 via wired or wireless two-way network communication technology. In addition to providing a lookup function, the remote database 160 may also accept upload of updated data to continuously expand the database content. For example, the host device 130 may utilize a Structured Query Language (SQL) to communicate with the remote database 160.

Based on the system architecture of FIG. 1, the audio system 100 proposed in the present application may achieve at least the following technical effects. Firstly, the audio system 100 allows dynamic tracking of the user's position to be a target listening spot. The audio system 100 may also dynamically obtain the spatial configuration information of the ambient object as a basis for optimizing the soundstage effect. Furthermore, the audio system 100 dynamically compensates the speaker output according to the user position and ambient object spatial configuration information, to eliminate object interferences and optimize the listening experience on the target listening spot. In an embodiment, the dynamic user position tracking may employ multiple technical solutions such as cameras, infrared sensors, or wireless positioning. The implementation of spatial configuration information acquisition of the ambient objects 175 may be automated or manual. For example, the audio system 100 may use a camera to capture images and perform artificial intelligence identification, or through a configuration program to manually input the environmental conditions of the scene. Embodiments of the speaker output compensation may be implemented based on several different algorithms. For example, this specification of the invention provides a channel-based algorithm and an object-based algorithm.

Figure 2:
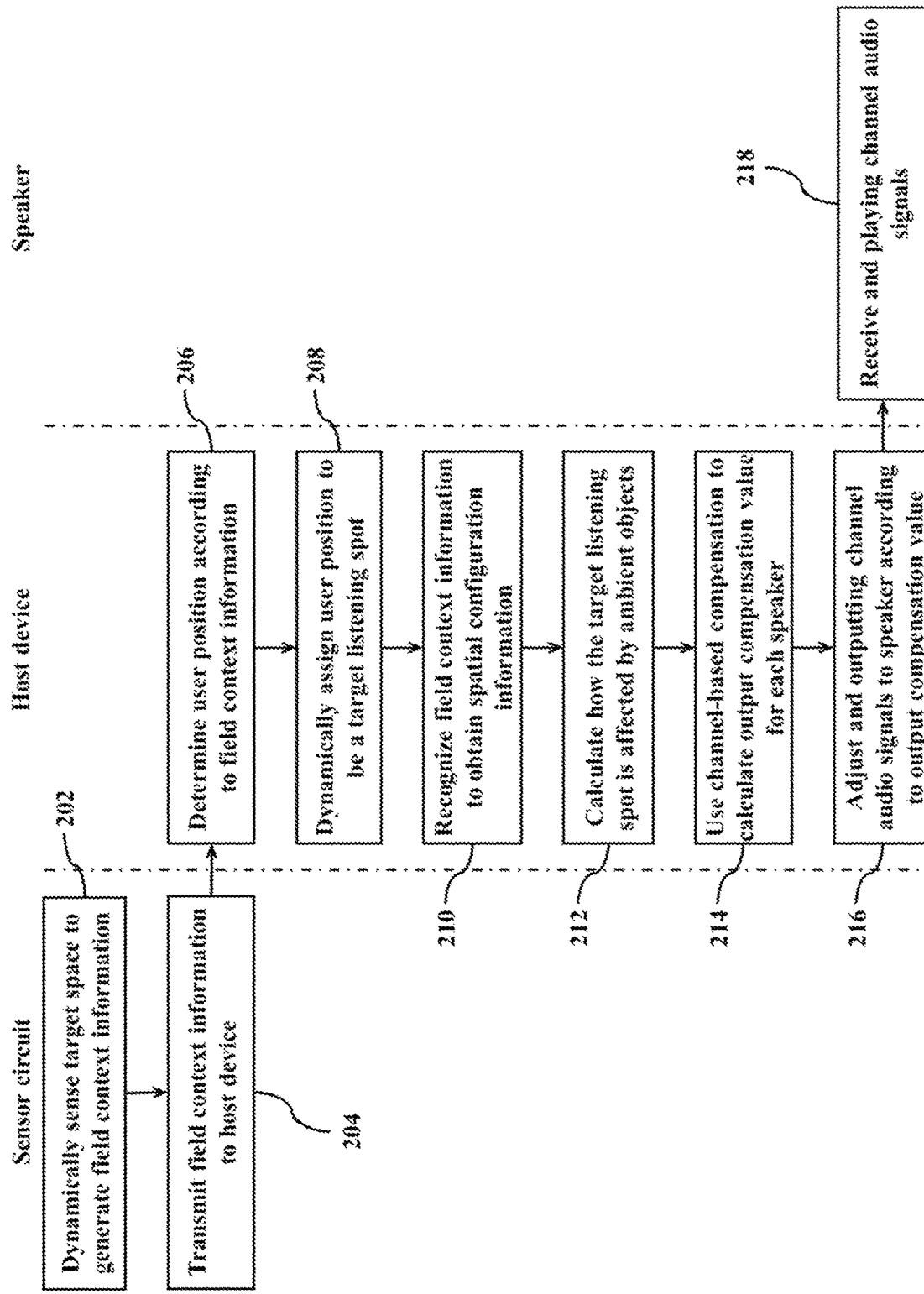
FIG. 2 is a flowchart of a dynamic sound optimization method according to an embodiment of the present invention.

An embodiment about how the audio system 100 dynamically tracks the user position, obtains a sound field environment configuration using a camera, and compensates the speaker output with channel-based compensation operation, is illustrated in FIG. 2 as described below.

FIG. 2 is a flowchart of a dynamic sound optimization method according to an embodiment of the present invention.

In the flowchart of FIG. 2, the processes located in a column corresponding to a particular apparatus, described the processes executed by the particular apparatus. For example, the processes marked in the "sensor circuit" column, are processes performed by the sensor circuit 140. The processes marked in the "host device" column are related to processes performed by the host device 130. The processes marked in the "speaker" column, are processes conducted by the first speaker 110 and/or the second speaker 120. The other parts of the figures are described analogously in the same planning, so are the other flowcharts below.

In operation 202, the sensor circuit 140 dynamically senses the target space 170 to generate field context information. In the embodiment, the field context information may comprise optical, thermal, or electromagnetic wave information in the target space 170. For example, the sensor circuit 140 may comprise a camera, continuously capturing a video of the target space 170 in a video recording manner, or periodically snapshotting the target space 170 to acquire still photos of the target space 170. In another embodiment, the sensor circuit 140 may further comprise an infrared sensor, arranged to capture a thermal image in the target space. The thermal image generated by infrared sensors, may provide more than just depth information of the space. Since the infrared sensor is extremely sensitive to temperature changes, it is particularly suitable for tracking the user's position. In another embodiment, the sensor circuit 140 may further comprise a wireless detector, disposed in the target space 170 for detecting a wireless signal of an electronic device. When a user is holding an electronic device, the wireless detector can detect the beacon time difference of the electronic device or the strength of the wireless signal, as an auxiliary means of tracking the user's location. The electronic device may be the user's own mobile phone, a special beacon generator, a virtual reality headset, a game handle, or a remote control of the audio system 100. It will be appreciated that the embodiment does not limit the number of sensor circuits 140, nor does it limit the use of only one sensing scheme at a time. For example, the audio system 100 of the embodiment may employ a plurality of sensor circuits 140 to work together from various locations, or simultaneously employ one or more cameras, infrared sensors and wireless detectors. Thus, the host device 130 is allowed to obtain more comprehensive field context information to acquire subsequent identification results more accurately.

In operation 204, the sensor circuit 140 transmits the acquired field context information to the host device 130. The sensor circuit 140 may transmit data in a continuous manner, such as video streaming, or in a periodic manner for still image data. The duty cycle of the transmission action performed by the sensor circuit 140 may be adaptively adjusted according to the amount of information of the field context information, the tracking accuracy requirements, and the computing power of the host device 130. The sensor circuit 140 and the host device 130 may be connected via a dedicated cable, or via a communication circuit 136. In a further derived embodiment, the sensor circuit 140 may share the audio transmission circuit 135 with the speaker, whereby the field context information is transmitted to the host device 130 through the audio transmission circuit 135.

In the operation 206, the host device 130 determines the user position according to the field context information received from the sensor circuit 140. The recognizer circuit 134 in the host device 130 may perform identification operations on the field context information, such as applications of artificial intelligence. As the sensor circuit 140 may implement different sensing technology, the recognizer circuit 134 may adapt corresponding identification algorithms. It is appreciated that the target space 170 and the user position may be represented in two-dimensional space or three-dimensional space. If the audio system 100 is implemented with only a single sensor circuit 140, the position information of at least two-dimensional space can be perceived. If the audio system 100 is implemented with increased number of sensor circuits 140 or hybrid sensing schemes, the depth information in the three-dimensional space can be obtained for better recognition of the user position or the user's head position. In one embodiment, the recognizer circuit 134 may dynamically identify the user's head position, face orientation, or ear position according to the camera captures the sound ambient image. In another embodiment, the recognizer circuit 134 may analyze the movement trajectory of the thermal image generated by the infrared sensor to dynamically determine the position of the user 180. For another example, the recognizer circuit 134 may dynamically locate a coordinate value of the electronic device in the target space 170 according to the characteristics of the wireless signal detected by the wireless detector. By virtue of the coordinate value, the control circuit 132 may further speculate the position of the user's ear.

In operation 208, when the recognizer circuit 134 in the host device 130 analyzes the user position, the control circuit 132 in the host device 130 dynamically assigns the user position to be a target listening spot. To facilitate the description of subsequent embodiments, the target space 170 is described herein as a two-dimensional coordinate space or a three-dimensional coordinate space, and the target listening spot may be represented as a coordinate value in the target space 170. With the layout arrangements of the speakers, the range of the target listening spot may not be limited to a single point, which can also be a surface, or a three-dimensional area with predetermined length, width, and height. For example, after the recognizer circuit 134 analyzes the user's head position or ear position, the control circuit 132 may use the head position or ear position to determine the target listening spot. The control circuit 132 therefore performs subsequent compensation operations so that the playback effect obtained by the target listening spot is not affected by the user's movement. In practice, the control circuit 132 compensates for the listening experience at the target listening spot by adjusting the first channel audio signal 112 and the second channel audio signal 122. It is understandable that operation 208 may be dynamically executed when the user's location is changed. Thus, operation 208 is not limited to be performed in the order in which FIG. 2 is plotted. That is, the target listening spot can be updated in real time as the user's position changes. Further adjustment operations will be described below.

In operation 210, the recognizer circuit 134 in the host device 130 performs further recognition on the field context information provided by the sensor circuit 140 to obtain spatial configuration information of the ambient object in the target space 170. In other words, the field context information acquired by the sensor circuit 140, is not only used to determine the user position, but also useful for determining various ambient objects 175 presented in the target space 170. In one embodiment, when the camera in the sensor circuit 140 captures an ambient image of the target space 170, the recognizer circuit 134 analyzes the ambient image. One or more ambient objects 175 are thereby identified from the target space 170, along with the spatial configuration information of these ambient objects 175. The spatial configuration information comprises size, position, shape, appearance characteristics of the ambient object 175. The recognizer circuit 134 may also determine the acoustic attribute information of each ambient object 175 through artificial intelligence calculation or database lookups, including the acoustic absorption rate and reflectivity of sound. In a further derived embodiment, the recognizer circuit 134 may also determine the application scenario of the target space 170 according to the ambient image. The application scenario can be theater, living room, bathroom, outdoor, and so on. If the host device 130 is provided with the application scenario information related to the target space 170, the ambient object 175 in the target space 170 can be identified in shorter time with lower mis-judgement rate. Relevant embodiments will be illustrated in FIG. 9.

In operation 212, the control circuit 132 in the host device 130 may calculate how much the playback effect at the target listening spot is affected by the ambient object. The playback effect of a speaker at a target listening spot can be defined as the equal loudness or sound pressure level (SPL) received at the target listening spot. In the ISO226 standard, an equal response curve (Fletcher-Munson Curve) is defined, indicating that the equal loudness perceived by the user in different sub-bands actually corresponds to different sound pressure levels. In one embodiment, the control circuit 132 may employ an equal loudness contour as a standard reference for the playback effect, to calculate the sound pressure level received at the target listening spot under various scenarios. The control circuit 132 may use the spatial configuration information of the ambient object 175 and the acoustic attribute information to evaluate the interference caused by the ambient object 175 at the target listening spot, so as to further determine how to eliminate the interference. The spatial configuration information of the ambient object 175 and the influence of the attribute information may correspond to a variety of scenarios. For example, when the volume of the ambient object 175 gets larger, the interference coefficient respective to the target listening spot gets larger. Whether the ambient object 175 obstacles the user 180 and the speaker, is also a factor determining the playback effects. The ambient object 175, depending on the material, may absorb sound or bounce sound. Therefore, the control circuit 132 is required to accordingly select different parameters or formulas based on the acoustic attribute information, so as to calculate the degree of influence on the playback effects.

In operation 214, the control circuit 132 in the host device 130 performs a channel-based compensation operation to respectively calculate the output compensation value for the channel audio played in each speaker. The channel-based compensation operation is calculated separately on a per-channel audio basis when determining the playback effects at the target listening spot. Taking a first speaker 110 among a plurality of speakers for example, which plays a first channel audio signal 112. When the first channel audio signal 112 is transmitted through the air to the target listening spot, it may be interfered with by an ambient object 175 and lose energy. The change of the position of the target listening spot also affects the reception of the sound pressure level generated by the first channel audio signal 112. With the channel-based compensation operation, the control circuit 132 may calculate the amount of change in the sound pressure level the first channel audio signal 112 imposes at the target listening spot. The control circuit 132 of the embodiment adds an output compensation value for the first channel audio signal 112 to cancel the amount of change in the sound pressure level, so that the first channel audio signal 112 perceived at the target listening spot is restored to the state before being affected. In other words, the output compensation value has the same value as the amount of change in sound pressure level, but with opposite polarity.

In operation 216, the control circuit 132 adjusts and outputs the channel audio signal to the speaker according to the output compensation value. Since the adjusted channel audio signal has cancelled the influence caused by the user 180 movement in the target space 170 and the interference caused by the ambient object 175, the listening experience of the user 180 remains consistent. Taking the first speaker 110 and the second speaker 120 in the target space 170 as an example, the control circuit 132 calculates and adjusts the sound pressure levels of different sub-bands in the first channel audio signal 112 and the second channel audio signal 122, thereby mitigating the equal loudness deviation experienced by the user 180 due to movement. On the other hand, the control circuit 132 compensates the first channel audio signal 112 and the second channel audio signal 122 respectively according to the amount of sound pressure level change imposed at the target listening spot calculated from the position, size, and acoustic attribute information of the ambient object 175.

In operation 218, each speaker receives channel audio signal from the host device 130 correspondingly through the audio transmission circuit 135. Taking the first speaker 110 and the second speaker 120 in the target space 170 as an example, the control circuit 132 outputs the first channel audio signal 112 and the second channel audio signal 122 to the corresponding first speaker 110 and the second speaker 120 through the audio transmission circuit 135, respectively. Thus, the first speaker 110 and the second speaker 120 correspondingly play the adjusted first channel audio signal 112 and the second channel audio signal 122, so that the user 180 located at the target listening spot experiences an optimized listening effect. For ease of illustration, the embodiment of the target space 170 of FIG. 1 only depicts two speakers and an ambient object 175. However, it is understandable that in practice, the host device 130 may contain more than two speakers, and the number of ambient objects 175 is not limited to one. In a further derived embodiment, each speaker is specialized at playing different range of frequencies. For example, some speakers are mid-tweeters, and some speakers are subwoofers. When the control circuit 132 adjusts the channel audio signal, it can be arranged to further adjust corresponding outputs to the first channel audio signal 112 and the second channel audio signal 122 according to the characteristics of different speakers.

Figure 3:
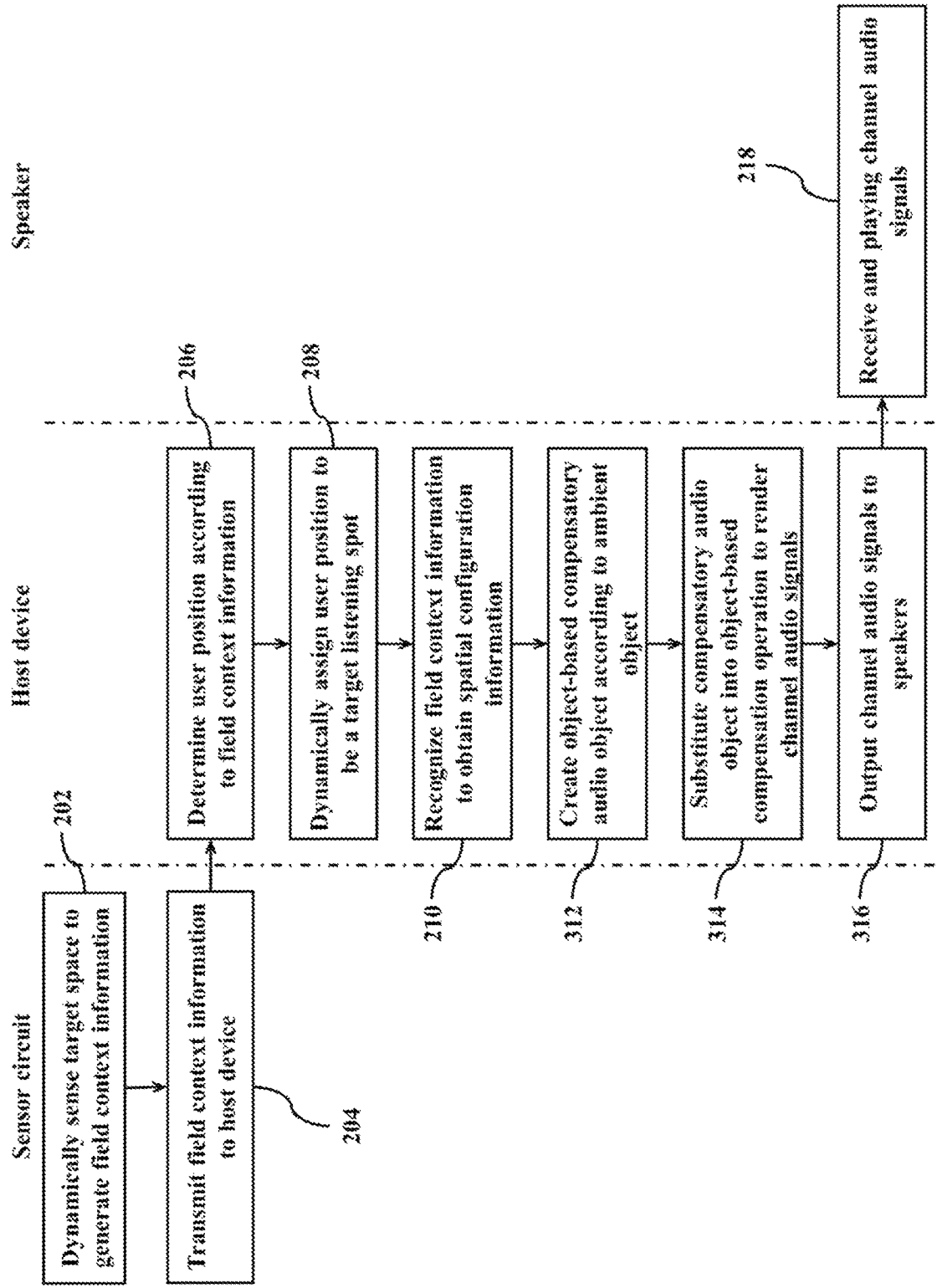
FIG. 3 is a flowchart of a dynamic sound optimization method according to an embodiment of the present invention.

The following description employs FIG. 3 to illustrate an embodiment of an audio system 100 that dynamically tracks the user position, uses the camera to obtain a sound field environment configuration, and performs an object-based compensation operation on the speaker outputs.

FIG. 3 is a flowchart of a dynamic sound optimization method according to an embodiment of the present invention.

In the flowchart of FIG. 3, the processes located in a column corresponding to a particular apparatus, described the processes executed by the particular apparatus. For example, the processes marked in the "Sensor Circuit" column, are processes performed by the sensor circuit 140. The processes marked in the "host device" column, are processes performed by the host device 130. The processes marked in the "speaker" column, are processes conducted by the first speaker 110 and/or the second speaker 120. The other parts of the figures are described analogously in the same planning, so are the other flowcharts below.

Processes 202, 204, 206, 208 and 210 in FIG. 3 are the same as the previous embodiments, and therefore not repeated herein for simplism of the specification.

When the audio system 100 of the embodiment completes operation 210, the control circuit 132 has tracked the position of the user 180 and assigned it as the target listening spot, wherein the configuration information of one or more ambient objects 175 in the target space 170 are also obtained. The object-based compensation operation is then explained in the subsequent processes, whereby channel audio signals for each of the speakers are adjusted.

The object-based acoustic system is originated from the audio mixing technology that creates virtual reality, wherein fancy audio object effects such as movement can be simulated by just a limited number of physical speakers. Some of the existing software products, such as Dolby Atmos, Spatial Audio Workstation, or DSpatial Reality, are in the category of object-based acoustic systems. A user can define the movement trajectory of a source object in a virtual space through a human-machine interface. The object-based system can use physical speakers to simulate the sound effect of the source object in this virtual space, allowing the user at the target listening spot to realistically feel the source object moving through space.

The object-based acoustic system is based on a large number of acoustic parameter matrix calculations. Each source object may comprise metadata that describes characteristics of the source object, including type, position, size (length, width, height), divergence, and so on. After the matrix calculations in the object-based operation, the sound of a source object will be assigned to one or more speakers and played together, and each speaker may relatively play a portion of the sound of the source object. In other words, the matrix calculations in the object-based operation can use multiple speakers to simulate spatial effects of a sole source object. The embodiment of FIG. 3 proposes an object-based compensation operation based on the object-based acoustic system to solve the problem of conventional playback effect.

In operation 312, the control circuit 132 in the host device 130 creates a compensatory audio object according to the ambient object 175 for use in the object-based acoustic system. In practice, the control circuit 132 first maps the target space 170 to an object-based space of virtual reality, and then creates a compensatory audio object in the object-based space according to the ambient object 175, for generating a sound source effect that cancels the influences of the ambient object 175. From the perspective of a user 180 located at the target listening spot, the presence of the ambient object 175 is analogous to a sound source object. In practical applications, the ambient object 175 may reflect the sound emitted by a speaker to the target listening spot. On the other hand, the ambient object 175 may also block or absorb a portion of the sound emitted by a speaker to the target listening spot, causing listen experience degradation. In other words, the control circuit 132 of the embodiment analogizes the ambient object as a sound source object, and creates a negative sound source object with the opposite sound source effect in the object-based space, as a means of counteracting the interference. The acoustic effect described in the embodiment may be referred to as sound pressure level, equal loudness, or gain value generated from the perspective of the target listening spot.

In operation 314, the host device 130 substitutes the compensatory audio object into the object-based compensation operation to render the channel audio signals. The object-based compensation operation may employ an object-based matrix calculation module in the existing object-based acoustic products to perform a large number of matrix operations related to acoustic interaction according to the metadata of the sound source object. For example, the metadata of the compensatory audio object comprises coordinate, size, reflectivity of sound, and acoustic absorption rate of the ambient object 175. The control circuit 132 performs an object-based compensation operation on the target listening spot according to the metadata to render the first channel audio signal 112 and the second channel audio signal 122 optimized for the target listening spot, such that the interference the ambient object 175 imposed on the target listening spot is cancelled.

In one embodiment, the object-based compensation operation is conducted on a plurality of sub-bands. Due to the nature of sound transmission, the sound pressure level in different sub-bands causes different equal loudness. Taking the impact from the first channel audio signal 112 generated by the first speaker 110 on the ambient object 175 as an example, the control circuit 132 of the embodiment may calculate based on the coordinate, the size, and the reflectivity of sound and acoustic absorption rate of the ambient object 175, a plurality of sound source effects passively generated by the ambient object 175 respectively responsive to a plurality of sub-bands of the first channel audio signal 112. Thereafter, the control circuit 132 creates a compensatory audio object according to the calculated sound source effects. In the embodiment, the compensatory audio object is correspondingly created according to the ambient object 175, wherein the metadata thereof comprises the same coordinate, size, and reflectivity of sound and acoustic absorption rate as the ambient object 175, which produces a sound source effect opposite to that of the ambient object 175.

The known human ear audible range is between 20 Hz (Hz) to 20000 Hz. The embodiment may divide the human ear audible range into a plurality of sub-band intervals to compensate separately. The bandwidth of each sub-band can be an exponential range. For example, an exponential range based on 10 can divide the sound signal into multiple sub-band ranges such as 10 Hz to 100 Hz, 100 Hz to 1000 Hz, 1000 Hz to 10000 Hz, and etc. In other embodiments, the division of bands may also be based on the needs of the fineness of the playback quality, such as a 2-based or 4-based exponential index. In the field of audio processing, the concept of multi-band subdivision is known in the equalizer technology, which will not be explained in depth herein.

After the control circuit 132 obtains the negative acoustic effect of the compensatory audio object, the object-based compensation operation is performed. The negative acoustic effect is correspondingly mixed into the first channel audio signal 112 and the second channel audio signal 122 according to a predetermined proportion determined by a mix operation, and thereby cancelling the interference the ambient object 175 imposed on the target listening spot. Regarding the object-based compensation operation, further descriptions will be provided in detail in the embodiments of FIGS. 11 to 13.

In operation 316, the host device 130 outputs the first channel audio signal 112 and the second channel audio signal 122 correspondingly to the first speaker 110 and the second speaker 120 according to the operation result of operation 314. Process 316 of FIG. 3 is different from operation 216 of the embodiment of FIG. 2. The embodiment of FIG. 2 calculates a compensation value for the existing channel audio signal to adjust the existing channel audio signal. The control circuit 132 in the object-based compensation operation, on the other hand, calculates the corresponding channel audio signal of each speaker at a time directly according to all the metadata. The object-based compensation operation synthesizes the components required for compensation into the channel audio signal in a form of a compensatory audio object. In other words, because the channel audio signal contains a compensated audio signal emitted by the compensatory audio object, the user 180 does not feel the impact of the presence of the ambient object 175 at the target listening spot.

It can be seen from operation 316, the object-based compensation operation converts the target listening spot and ambient object into the metadata of the object-based acoustic system, and then creates a compensatory audio object to simplify the operation processes for elimination of interferences and optimization of the playback effects. It should be understood that the audio system 100 of the embodiment may utilize the sensor circuit 140 to continuously or periodically track the position of the user 180, and dynamically update the target listening spot. The object-based compensation operation performed by the control circuit 132 may also be able to simultaneously update metadata of the relative position of the target listening spot 170 as the target listening spot is moved.

In FIG. 3, operation 218 is analogous to the previous embodiment, and therefore is not repeated herein for simplicity of the specification.

Figure 4:
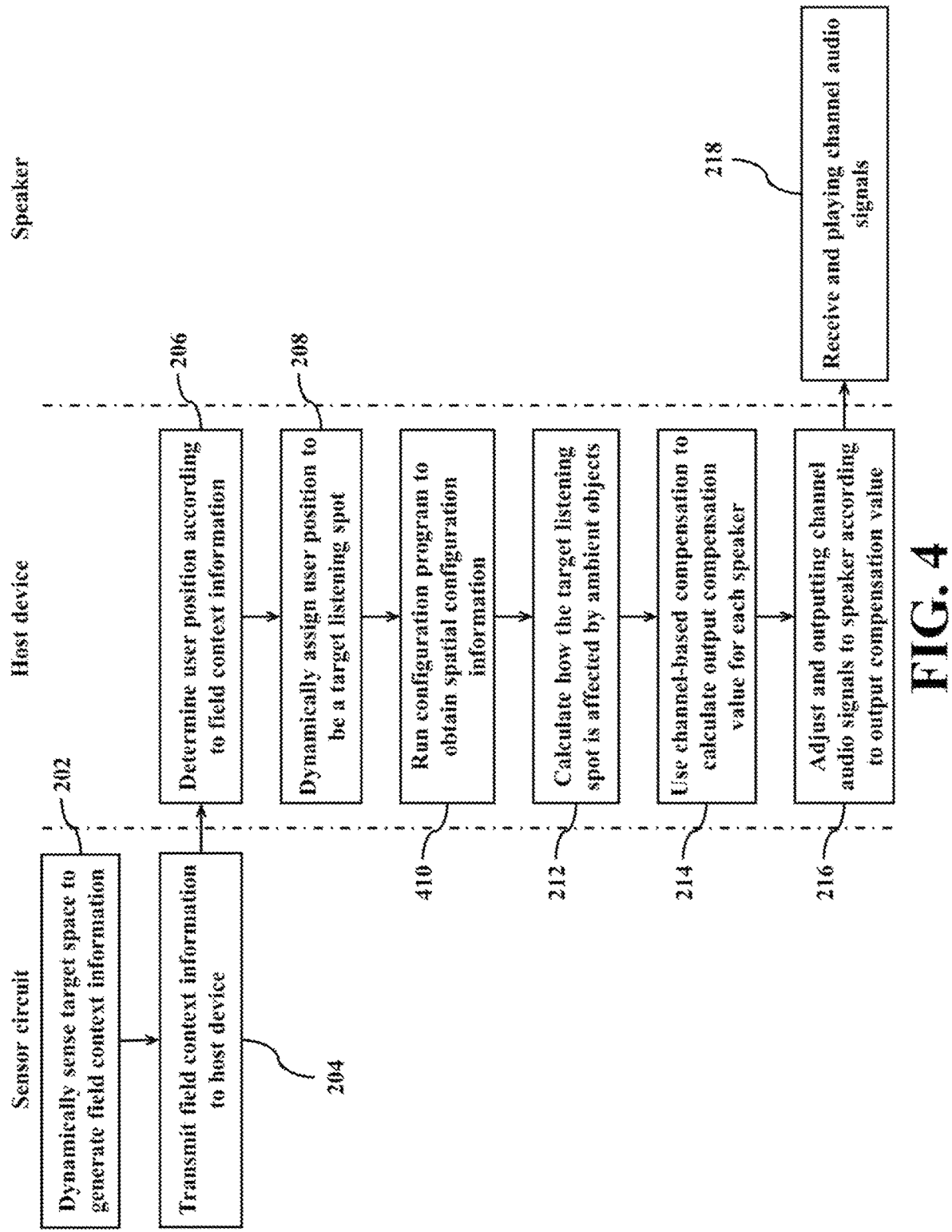
FIG. 4 is a flowchart of a dynamic sound optimization method according to an embodiment of the present invention.

The following description employs FIG. 4 to illustrate an embodiment of an audio system 100 that dynamically tracks the user position, runs a configuration program to obtain the sound field environment configuration, and compensates the speaker output using the channel-based compensation operation.

FIG. 4 is a flowchart of a dynamic sound optimization method according to an embodiment of the present invention.

In the flowchart of FIG. 4, the processes located in a column corresponding to a particular apparatus, described the processes executed by the particular apparatus. For example, the processes marked in the "sensor circuit" column, are processes performed by the sensor circuit 140. The processes marked in the "host device" column are related to processes performed by the host device 130. The processes marked in the "speaker" column, are processes conducted by the first speaker 110 and/or the second speaker 120. The other parts of the figures are described analogously in the same planning, so are the other flowcharts below.

Processes 202, 204, 206, and 208 in FIG. 4 are the same as the previous embodiments, and therefore are not repeated herein for simplicity of the specification.

When the audio system 100 of the embodiment completes operation 210, the control circuit 132 has tracked the position of the user 180 and assigned it as the target listening spot, wherein the configuration information of one or more ambient objects 175 in the target space 170 are also obtained. The object-based compensation operation is then explained in the subsequent processes, whereby channel audio signals for each of the speakers are adjusted.

In order to eliminate the interference in the sound field environment, the audio system 100 needs to obtain spatial configuration information related to various ambient objects 175 in the target space 170.

In operation 410, the control circuit 132 in the host device 130 may run a configuration program to obtain spatial configuration information of one or more ambient objects 175 in the target space 170. In the previous embodiment, the host device 130 uses a sensor circuit 140 to capture the field context information to automatically identify the spatial configuration information of an ambient object 175. When the configuration program is executed, the host device 130 may utilize a user interface circuit 133 to interact with the user, allowing the user to manually enter spatial configuration information of the ambient object 175. The user interface circuit 133 may provide a screen and an input method, allowing the user to define the spatial configuration information of various objects in the target space 170 in a two-dimensional plane or a three-dimensional diagram. The spatial configuration information of the ambient object 175, may include relative position, size, name, and material type of the ambient object 175 in the target space 170. In a further derived embodiment, the user 180 may inform the host device 130 through the user interface circuit 133 an adequate application scenario for the current target space 170. In different application scenarios, such as open outdoor spaces, theater spaces, or bathrooms, the types of frequently seen ambient objects 175 are different, and the soundstage atmosphere felt by users is also different. It is one of the essential functions for an audio system 100 to optimize the soundstage atmosphere in different application scenarios.

Different material types feature different acoustic properties. When the host device 130 runs the configuration program, the host device 130 further queries an object database according to the object name or material type input by users, to obtain acoustic attribute information of the ambient object 175, such as the acoustic absorption rate or reflectivity of sound. Thus, in the subsequent operation 212, the host device 130 is allowed to calculate the degree to which the playback effect of each speaker on the target listening spot is affected by the ambient object 175, according to the aforementioned spatial configuration information and acoustic attribute information. In a further derived embodiment, the host device 130 may be able to prioritize the usage of one of a plurality of object databases based on the adequate application scenario of the target space 170, so as to accelerate the identification of the ambient object 175 in the target space 170. Relevant embodiments will be illustrated in FIG. 9.

Processes 212, 214, 216, and 218 in FIG. 4 are the same as the previous embodiment, and therefore are not repeated herein for simplicity of the specification.

The embodiment of FIG. 4 illustrates that in addition to dynamically tracking the user position, the audio system 100 also allows the user 180 to setup the spatial configuration information of the ambient object 175 in the target space 170 through a configuration program. The configuration program provides a manual input interface to compensate for the lack of identification capabilities. In addition to assisting the host device 130 to make better decision with the auxiliary inputs, the user also has the opportunity to deliberately customize different application scenarios according to their own preferences, or deliberately set the imaginary virtual audio object to change the playback effect. The host device 130 performs the channel-based compensation operation to calculate corresponding output compensation values of each speaker according to the spatial configuration information of the ambient object 175 in the target space 170.

Figure 5:
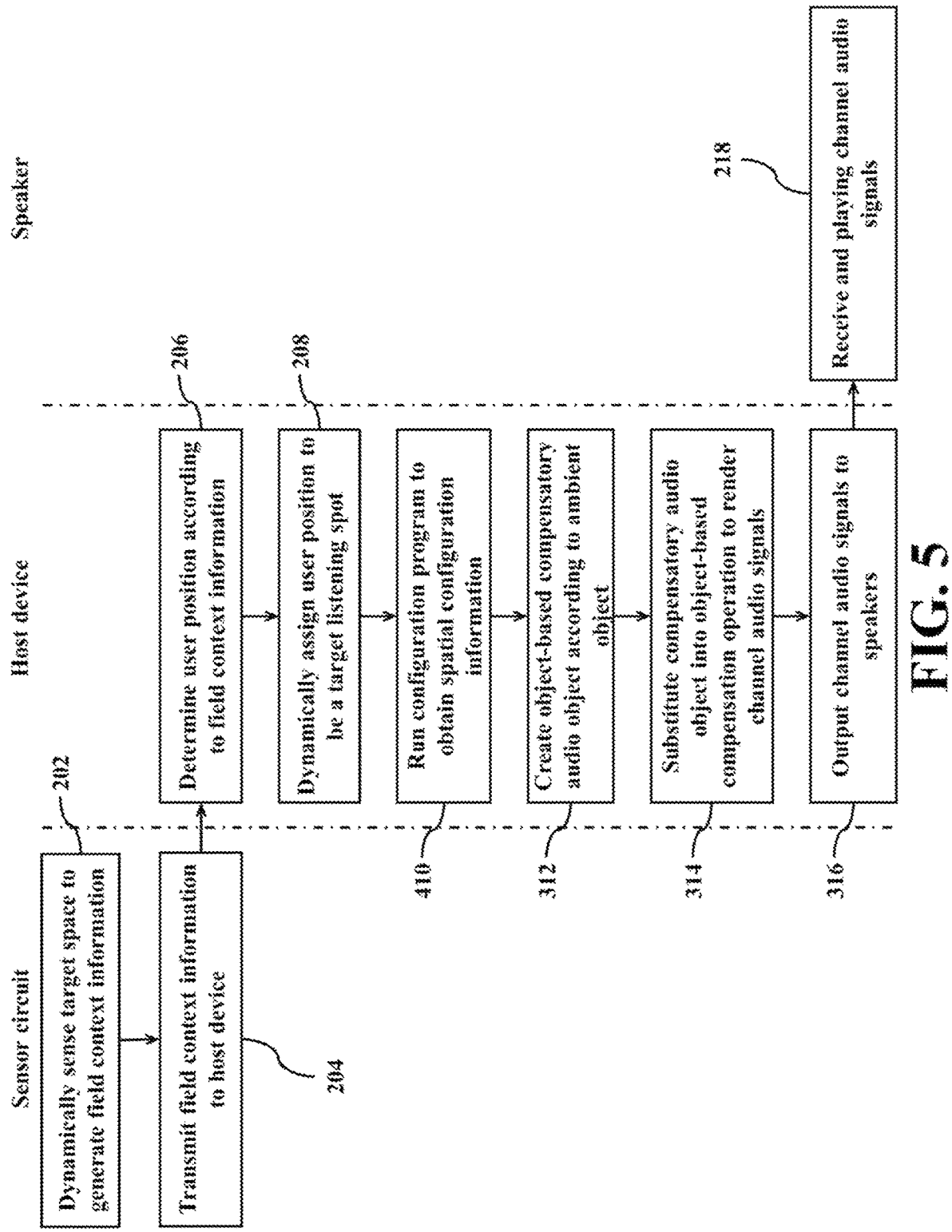
FIG. 5 is a flowchart of a dynamic sound optimization method according to an embodiment of the present invention.

The following embodiment uses FIG. 5 to illustrate an embodiment of the audio system 100 that dynamically tracks the user position, runs the configuration program to obtain the sound field environment configuration, and compensates the speaker output with the object-based compensation operation.

FIG. 5 is a flowchart of a dynamic sound optimization method according to an embodiment of the present invention.

In the flowchart of FIG. 5, the processes located in a column corresponding to a particular apparatus, described the processes executed by the particular apparatus. For example, the processes marked in the "sensor circuit" column, are processes performed by the sensor circuit 140. The processes marked in the "host device" column are related to processes performed by the host device 130. The processes marked in the "speaker" column, are processes conducted by the first speaker 110 and/or the second speaker 120. The other parts of the figures are described analogously in the same planning, so are the other flowcharts below.

Processes 202, 204, 206, 208, and 210 in FIG. 5 are the same as the previous embodiments, and therefore not repeated herein for simplicity of the specification.

The embodiment of FIG. 5 is analogous to the embodiment in FIG. 4, wherein operation 410 is processed to eliminate interference in the sound field environment.

In operation 410, the host device 130 may run a configuration program to obtain spatial configuration information of one or more ambient objects 175 in the target space 170. In the embodiment of FIG. 4, it is illustrated that the host device 130 may receive the spatial configuration information of the ambient object 175 manually entered by the user through a user interface circuit 133. In a further derivative embodiment, the host device 130 may also use a communication circuit 136 to receive spatial configuration information transmitted by the user device 150 or other devices. For example, the user device 150 may be a mobile phone, running an application to provide functions similar to the user interface circuit 133. The application allows the user to define the scope and size of the target space 170, the position of each speaker relative to the target space 170, the position, size, name and type of various ambient objects 175, even the location where the user 180 itself is located. The application may also communicate with the control circuit 132 through the communication circuit 136 to perform various playback operations, such as playback, pause, fast forwarding, adjusting the volume and the like. Furthermore, the user may configure the application scenario of the target space 170 through the user interface circuit 133, allowing the host device 130 to produce a diversified playback effect on the target space 170.

In a further derived embodiment, the user device 150 coupled by the host device 130 may be a virtual reality device or a game console. The user device 150 generates a source signal for the host device 130 to play. The source signal may contain virtual objects that move around in a virtual reality space, such as an airplane or a fire-breathing dragon. The user device 150 may transmit metadata of these virtual objects to the host device 130, which then turn into a part of the spatial configuration information of the ambient objects in the target space 170. In other words, the host device 130 may employ an object-based acoustic system to process virtual objects and physical objects without discrimination. Through an object-based compensation operation, the host device 130 may allow the user to feel that there is a virtual object in the target space 170, and may also allow the user not to feel the interference of a physical object in the target space 170. Regarding the implementation of the object-based compensation operation, further descriptions are provided in the embodiments of FIGS. 11 to 13.

When the audio system 100 of the embodiment completes operation 410, the control circuit 132 has tracked the position of the user 180 to assign the target listening spot, and also obtained the spatial configuration information of one or more ambient objects 175 in the target space 170. Then in processes 312 to 316, the host device 130 uses an object-based algorithm to adjust the channel audio signal of each speaker. Since processes 312 to 316, and processes 218 are the same as the previous embodiments, details are omitted herein for simplicity of the specification.

The embodiment of FIG. 5 illustrates that in addition to dynamically tracking the user position, the audio system 100 also allows the user 180 to set spatial configuration information of ambient objects 175 in the target space 170 through a configuration program. The configuration program can be integrated with existing virtual reality technology to receive spatial configuration information for virtual objects. The audio system 100 converts the physical ambient objects 175 and virtual objects into metadata of a consistent format, and then applies all the metadata to the object-based matrix calculation module in the existing object-based acoustic system to perform the object-based compensation operation. Thus, the control circuit 132 does not need to develop additional computing modules for different objects, which can reduce costs and improve execution efficiency.

Figure 6:
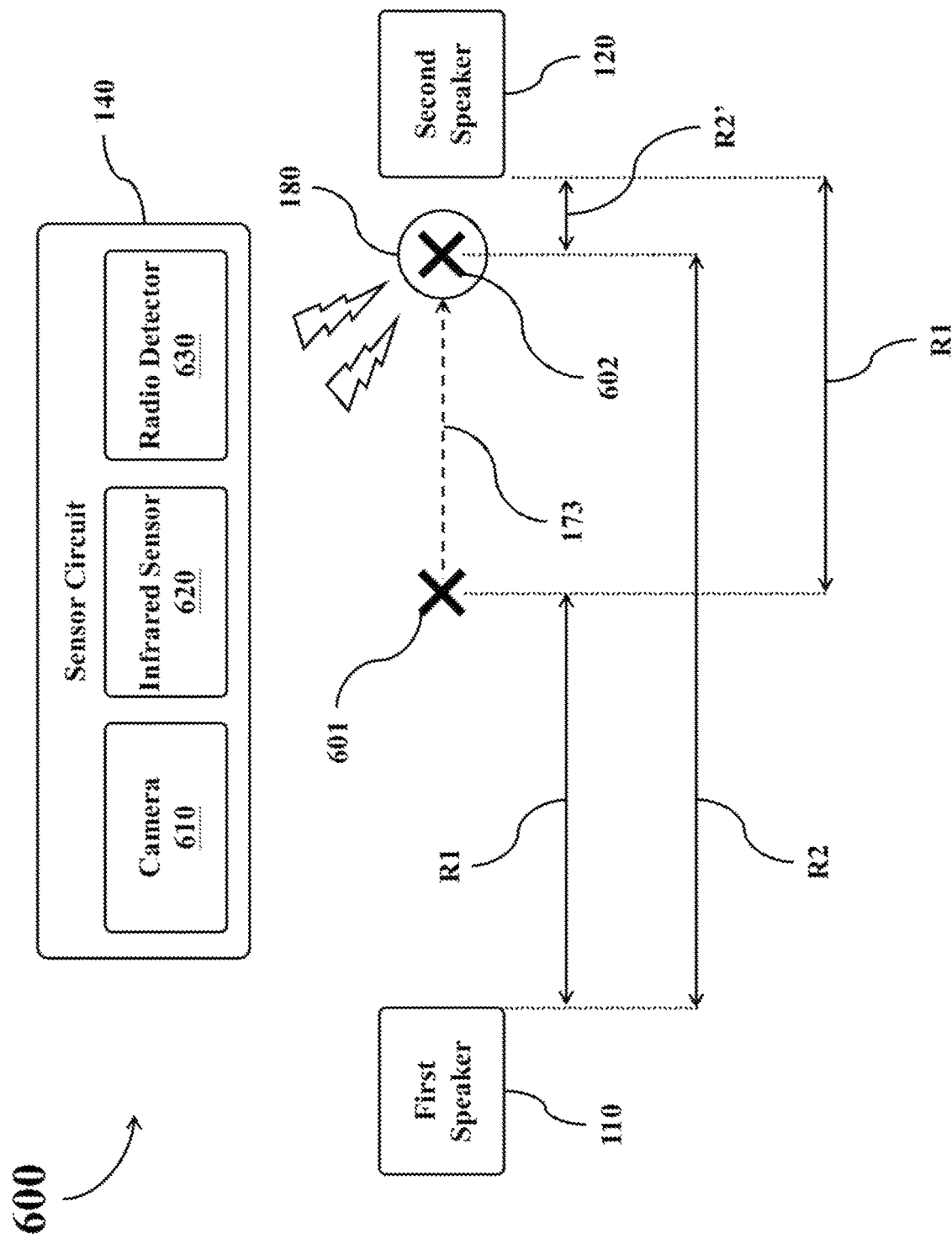
FIG. 6 shows a schematic view of a target space according to an embodiment of the present invention, illustrating an audio adjustment according to the position of the optimal listening spot.

The following description uses FIG. 6 to illustrates several embodiments of the sensor circuit, and the channel-based compensation algorithm.

FIG. 6 is a schematic view of a target space 600 of the present invention, for illustrating an embodiment for calculating the amount of the audio adjustment according to the position of the optimal listening spot.

The audio system of the present application 100 uses a sensor circuit 140 to dynamically sense the target space 600 and generate the field context information. The field context information mainly comprises the location of the user 180, and may also contain spatial configuration information of the ambient object 175. The technical solutions for dynamic sensing can be available with diverse options. For example, the sensor circuit 140 may be a combination of one or more of the cameras 610, the infrared sensor 620, the wireless detector 630, respectively, configured in different locations around the target space 600, providing field context information comprising spatial depth information that helps the recognizer circuit 134 and control circuit 132 in the host device 130 to track the position of the user 180 more efficiently. Thus, the recognizer circuit 134 uses the field context information provided by the sensor circuit 140 to identify not only the user 180 position, but also the face facing direction, ear position, and even gestures or body posture. As a result, the control factors applicable for adjusting the sound field are enriched. For example, focus detection, sleep detection, gesture control, and etc.

In the target space 600 of FIG. 6, a first speaker 110 and a second speaker 120 are arranged. The channel-based compensation operation calculates the output compensation value for each speaker individually. In a default scenario, the target listening spot is located in the center of the target space 600, i.e., the first location 601 in FIG. 6. The distance from the first location 601 to the first speaker 110 and the second speaker 120 is identically R1. At this time, the first channel audio signal 112 and the second channel audio signal 122 played by the first speaker 110 and the first channel audio signal 112 are also in a default state wherein no compensation process is required for the position.

When the user 180 moves from the first location 601 along the movement trajectory 173 to the second location 602, the sensor circuit 140 detects a new position of the user 180, and the target listening spot of the audio system 100 is assigned to the second location 602. Meanwhile, the distance between the user 180 and the first speaker 110 is changed to R2, and the distance between the user 180 and the second speaker 120 is changed to R2'. From the perspective of the user 180, the first speaker 110 becomes farther away, so the first channel audio signal 112 received is attenuated by distance. Conversely, the second speaker 120 became closer, and the received second channel audio signal 122 is enhanced. In other words, the intensity of the first channel audio signal 112 and the second channel audio signal 122 received on the second location 602 are imbalanced. The embodiment utilizes the channel-based algorithm, so that the listening experience received at the second location 602 is reduced to the same default state as the first location 601. In other words, the control circuit 132 compensates for the first channel audio signal 112 and the second channel audio signal 122 output from the first speaker 110 and the second speaker 120, to cancel the listening effect deviation caused by the movement of the user 180. The target space 600 shown in FIG. 6 is not limited to a multi-speaker environment that is only suitable for horizontal configuration. In a 3D soundstage environment with an upper and lower speaker, the problem of distance deviation may also occur. For example, if a user changes from a standing position to a seated position, the user actually moves away from the upper speaker and gets close to the lower speaker.

To obtain a better compensation effect, the embodiment uses equal loudness as a calculation standard. For example, the embodiment may employ the equal loudness curve defined by the ISO226; 2003 standard to calculate the sound pressure level that needs to be compensated at the target listening spot. Each audio channel is divided into multiple sub-bands for processing separately. In addition, different ranges of the distance between the user 180 and the speaker correspond to different sound formula. Since the equal loudness curve defines a linear relationship between the equal loudness and the sound pressure level, the equal loudness and the "gain value" in decibels have a linear correspondence. Thus, the measurement unit for performing the adjustment in the embodiment is not limited to equal loudness, sound pressure level, or gain value.

In the audio system 100, the space where sound is transmitted by air vibration is called a sound field. In a closed room, due to the presence of reflections, the sound field can be distinguished into many types: (1) near field: when the user 180 is located relatively close to the sound source, the physical effects of the sound source (such as pressure, displacement, vibration) will enhance the sound; (2) reverberant field: sound is reflected by objects to cause wave superposition effect; (3) free field: a sound field that is not interfered with by the aforementioned near and reflected sound fields. The above reflected and free sound fields can be collectively referred to as a far field.

In many of today's audio systems, the near and far fields are defined differently. For example, if R is the distance (meter, m) between a speaker and a user, L is the width of the speaker (m), and λ is the representative wavelength (m) of a sub-band signal, then the desirable conditions for the far field include the following types:

$$R >> \lambda/2\pi \quad (1)$$

$$R >> L \quad (2)$$

$$R >> \pi L2/2\lambda \quad (3)$$

Take the first speaker 110 of FIG. 1 as an example. When the distance from the target listening spot to the first speaker 110 is greater than the wavelength of the sub-band signal or a specific proportion of the size of the first speaker 110, the audio system 100 determines that the sound field type is a distant sound field. When the distance of the target listening spot to the first speaker 110 is less than the wavelength of the sub-band signal or the specific proportion of the size of the first speaker 110, the sound field type is deemed to be a near field. In a simpler practice, the audio system 100 may take a twice value (22) of the wavelength corresponding to a central frequency of a sub-band signal to be a demarcation point between the far field and the near field.

In the far field, a relationship between the sound pressure level change and the distance change when the user 180 receives a sub-band signal from the speaker is as follows:

$$SPL2 = SPL1 - 20 \log_{10}(R2/R1) \quad (4)$$

Wherein, SPL2 is the sound pressure level of the sub-band signal received by the new position, SPL1 is the sound pressure level of the sub-band signal received at the original position, R2 is the distance between the new position and the speaker, R1 is the distance between the original position and the speaker.

From Equation (4), it can be seen that the difference between SPL1 and SPL2 is the amount of sound pressure that the speaker that needs to be compensated.

$$SPL2' = SPL2 + 20 \log_{10}(R2/R1) = SPL1 \quad (5)$$

Wherein, SPL2' is the sound pressure level of the sub-band signal received by the new position after compensation. From formula (5) it can be seen that the embodiment is to compensate for the changed portion.

In the near field, the relationship between the distance change when the user 180 receives the sound pressure level of the sub-band signal received from the speaker and is as follows:

$$SPL2 = SPL1 - 10 \log_{10}(R2/R1) \quad (6)$$

$$SPL2' = SPL2 + 20 \log_{10}(R2/R1) = SPL1 \quad (7)$$

From formulas (6) and (7), it can be seen that the slope of sound attenuation in the near field is gentler than that of the far field, while the other calculation logics are analogous.

It is understandable that the above formula may have exceptions when encountering some exceptional circumstances. For example, when the user 180 moves from the first location 601 to the second location 602 and gets close to the second speaker 120, the distance between the user 180 and the second speaker 120 becomes smaller from R1 to R2', which leads to a negative result in equation (7). However, the sub-band signal output of the second speaker 120 cannot be negative, wherein the minimum allowable value is the lowest audible value to the human ear. For example, the sound pressure level of the sub-band signal output by the second speaker 120 is zero. On the other hand, when the user 180 moves from the first location 601 to the second location 602 and away from the first speaker 110, the distance between the user 180 and the first speaker 110 is increased from R1 to R2. The maximum output limit of the first speaker 110 may not be able to satisfy formula (5). In that case, the audio system 100 may issue an overload alert to the user 180.

The embodiment of FIG. 6 highlights the following advantages. Through the channel-based compensation algorithm, the optimal listening spot for user is not affected by movement. The calculation of the channel-based is simple and efficient, and can be applied in most of the target space 600.

FIG. 6 has illustrated a sound compensation method according to the user 180 movement. The following description uses FIG. 7 to illustrate a sound compensation method for the ambient object 175. The acoustic attribute information of the ambient object 175 comprises reflectivity of sound and acoustic absorption rate. The embodiment adapts an appropriate calculation method to calculate the acoustic influence of the ambient object according to the spatial configuration information of the ambient object 175.

Figure 7:
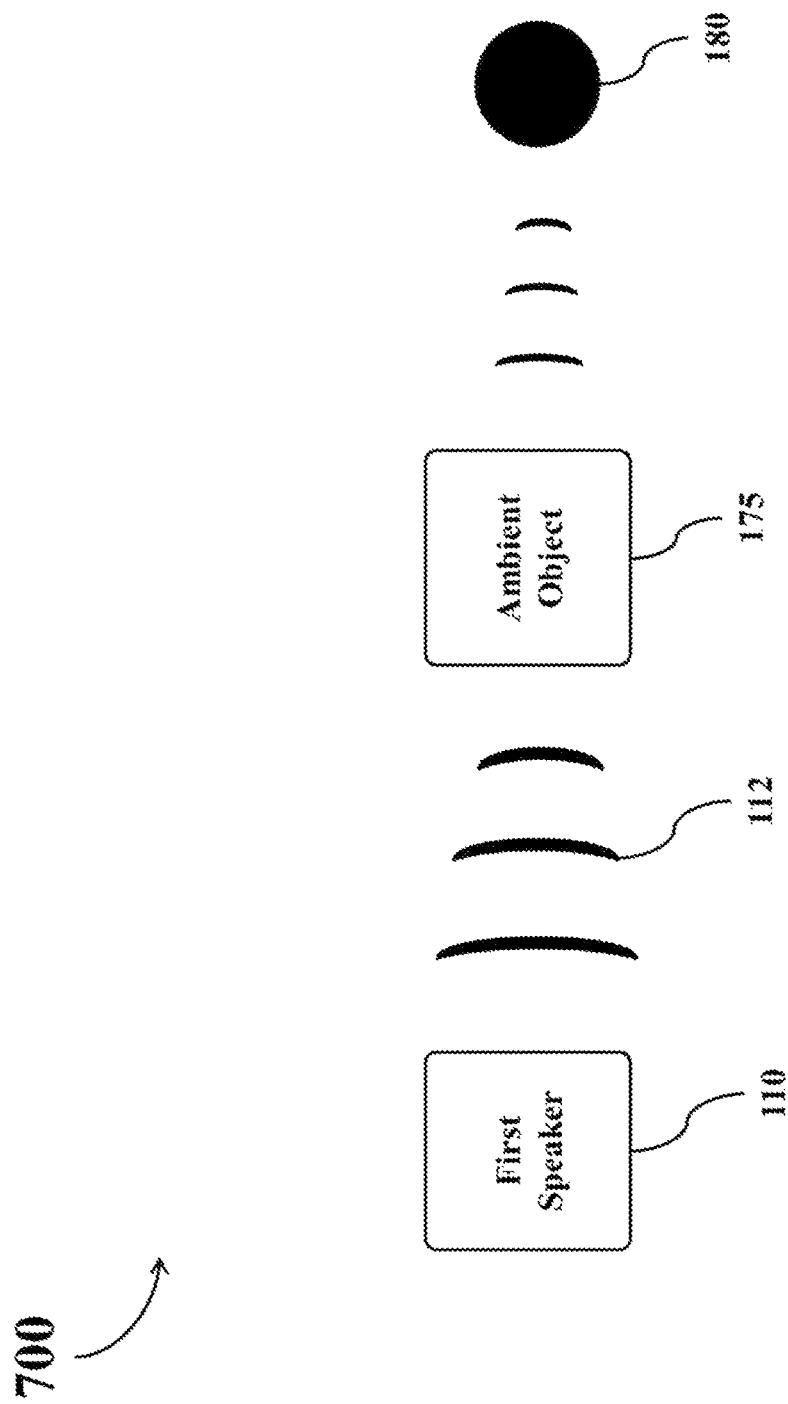
FIG. 7 shows a schematic view of a target space according to an embodiment of the present invention, illustrating an audio adjustment according to the acoustic absorption rate of the ambient object.

FIG. 7 is a schematic view of a target space 700 of the present invention, for illustrating an embodiment of calculating the amount of audio adjustment according to the acoustic absorption rate of the ambient object.

FIG. 7 shows a target space 700, wherein an ambient object 175 is located in the middle of a first speaker 110 and a user 180. For example, the ambient object 175 may be a sofa or a pillar. In this case, the ambient object 175 may cause listening experience for the user 180 to decay due to occlusion. In other words, the sound pressure level received by the user 180 from the first speaker 110 will be obscured or absorbed. When the control circuit 132 interprets this layout condition through the spatial configuration information, the acoustic absorption rate of the ambient object 175 is used to calculate a degree of influence to which the playback effect the first speaker 110 imposes at the target listening spot (the position of the user 180) is affected by the ambient object 175, to determine the equal loudness, sound pressure level or gain value of the first channel audio signal 112 needs to be output.

In one embodiment, the sound pressure level received by the ambient object 175 from the first speaker 110 may be used to calculate the sound loss absorbed by the ambient object 175:

$$At[n] = R[n] * SPLt \quad (8)$$

wherein n represents the number of the sub-band. That is, the first channel audio signal 112 output from the first speaker 110 may be divided into a plurality of sub-bands to be separately calculated. At[n] represents the gain value of the nth sub-band detected at time point t. R[n] represents the acoustic absorption rate of the nth sub-band. SPLt represents the sound pressure level of the first speaker 110 received by the ambient object 175 at the time point t. The time point t may represent the time difference between the sound transmitted from the first speaker 110 to the ambient object 175.

It can be seen from Equation (8) that At[n] represents a gain value on the n-th sub-band of a first channel audio signal 112 absorbed by the ambient object 175, but also represents an output compensation value required to play the n-th sub-band of the first channel audio signal 112. Thus, when the control circuit 132 generates the first channel audio signal 112 through the first speaker 110, the nth sub-band gain value of the first channel audio signal 112 is increased by the gain value At[n].

The configuration of the ambient object 175 located in the middle of the first speaker 110 and the user 180 may have a variety of scenarios. The embodiment is based on whether the line of sight between the first speaker 110 and the user 180 is obscured, or even further, based on whether a line of sight between to the first speaker 110 and the user car is obscured. It will be appreciated that the SPLt itself is a function related to the distance of the ambient object 175 and the first speaker 110, and time. The calculated degree of influence of At[n] on the user 180 is a function related to the distance of the ambient object 175 and the user 180, and time. When the arrangement of different angles and the relative placements are jointly considered, a variety of nonlinear correlations are involved. The present application is not intended to limit derivative changes of formula (8). Other weight coefficients, parameters, and offset correction values may be included depending on practical implementations. For example, there may be a sofa placed between the user 180 and the first speaker 110. Although the sofa does not block the line of sight, it may still affect the sound pressure level transmitted from the first speaker 110 to the user 180. The control circuit 132 may incorporate an interpolation method or other correction formula according to equation (8) to make the compensation result more in line with practical requirements.

Figure 8:
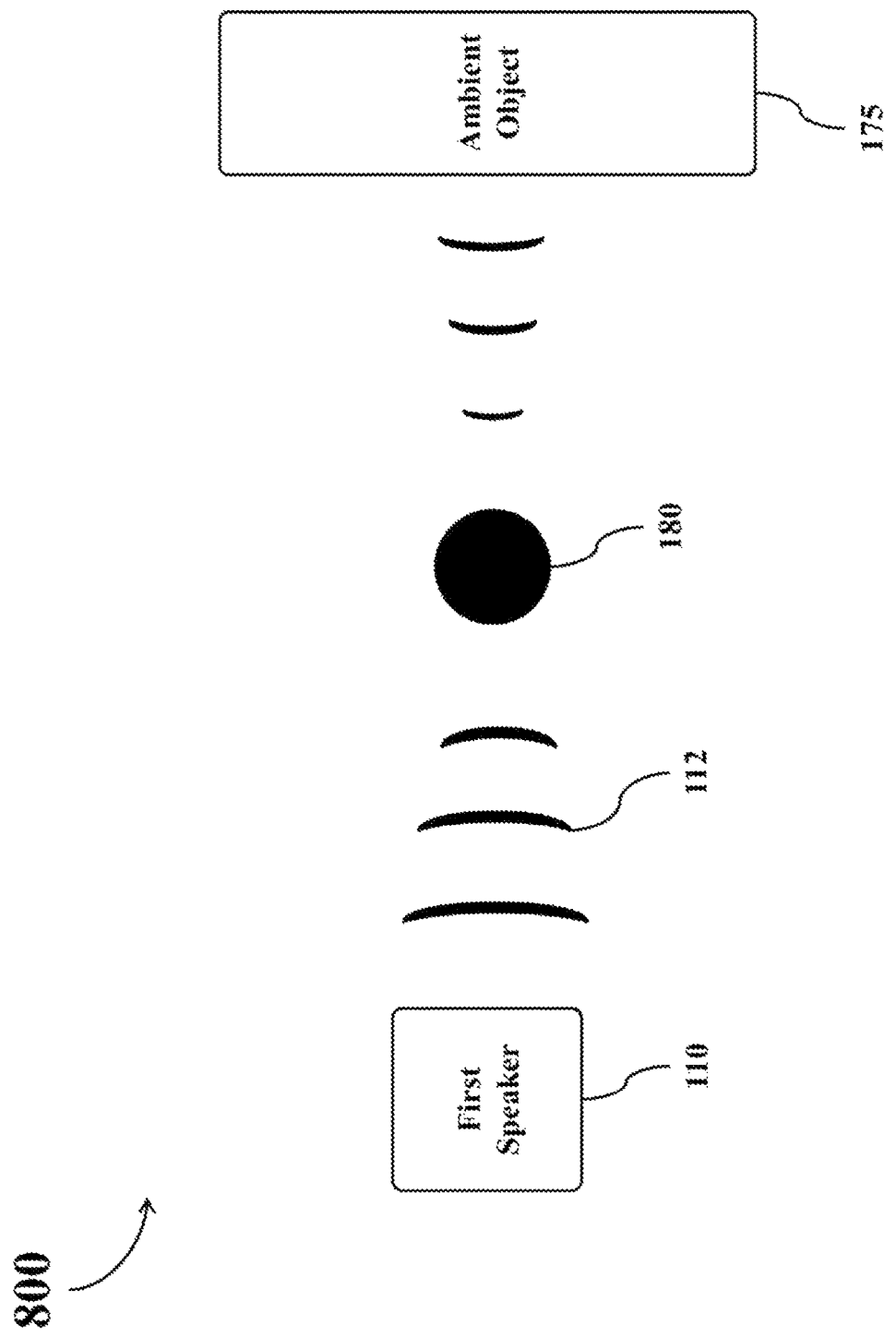
FIG. 8 shows a schematic view of a target space according to an embodiment of the present invention, illustrating an audio adjustment according to the reflectivity of sound of the ambient object.

FIG. 8 is a schematic diagram of a target space 800 of the present invention, for illustrating an embodiment for calculating the amount of audio adjustment according to the reflectivity of sound of the ambient object.

FIG. 8 shows a target space 800, wherein a user 180 is located in the middle of a first speaker 110 and an ambient object 175. The environmental object 175 may be a wall, ceiling or floor. In this case, the ambient object 175 will bounce the first speaker 110 output of the first channel audio signal 112 to the user 180. In other words, the sound pressure level received by the user 180 from the first speaker 110 will be superimposed or interfered with. When the control circuit 132 interprets this layout condition through the spatial configuration information, the reflectivity of sound of the ambient object 175 is used to calculate a degree of influence on which the playback effect of the first speaker 110 at the target listening spot (the position of the user 180) is affected by the ambient object 175, so as to determine the equal loudness, sound pressure level or gain value that the first channel audio signal 112 needs to output.

In the embodiment, the effect caused by the ambient object 175 may also be calculated according to equation (8), but R[n] is changed to represent the reflectivity of sound of the ambient object 175 in the n-th sub-band.

A calculation result of Equation (8), At[n], may represent the amount of the first channel audio signal 112 reflected to the user 180 by the ambient object 175 on the nth sub-band. Thus, the control circuit 132 renders the first channel audio signal 112 through the first speaker 110 with appropriately reduced gain value, so that the total sound pressure level perceived by the user 180 from the first speaker 110 and the ambient object 175 is maintained at the predetermined level.

Similar to the embodiment of FIG. 7, the scenario that the user 180 in FIG. 8 is located in the middle of the first speaker 110 and the ambient object 175 may have a variety of changing scenarios. The embodiment may be dependent on whether a line of sight between the first speaker 110 and the ambient object 175 is obscured by the user 180. However, in practice, walls, ceilings, and floors have a reflective effect at any angle. Therefore, the operation formula of the embodiment is not limited to formula (8), and other nonlinear compensation calculation methods may be further derived according to the arrangement and the relationship between near and/or far placements. For example, the target space 800 can be classified into different application scenarios, such as living room, study, bathroom, theater, or outdoor and the like, depending on the materials of the wall/ceiling/floor, the room size, the room shape, and other characteristics. The host device 130 may first classify an adequate application scenario best suitable for the target space 800, and then adapt corresponding parameters or formulas for calculation, respectively.

The embodiments in FIG. 7 and FIG. 8 highlight the following advantages. Through the channel-based compensation operation, the impact on the listening experience of the user 180 caused by the ambient object 175 is eliminated. The channel-based compensation operation can flexibly apply different object acoustic properties according to the configuration of ambient objects, which can effectively cope with the optimization problems under a variety of complex environments.

In summary, the recognizer circuit 134 may receive information from the sensor circuit 140 to identify the position of the user 180 in the target space 170, allowing the control circuit 132 to dynamically assign the position of the user 180 to be the target listening spot. The compensation for the movement of the target listening spot performed by the control circuit 132, has been described in the embodiment of FIG. 6 and equations (4) to (7). The compensation performed by the control circuit 132 for the interference of the ambient object 175 is described in FIGS. 7 to 8 and Equation (8). These two compensation operations can be performed separately and applied to the channel audio signal. In other words, the final output of the optimized channel audio signal comprises a compensation value for the movement of the target listening spot, and also comprises compensation for interference of the ambient object 175.

The recognizer circuit 134 captures the field context information according to the sensor circuit 140, so that the position of the user 180 is identified. The identification process may also include the identification of the application scenario to help accelerate the subsequent operation of the control circuit 132. The following description uses FIG. 9 to illustrate how the host device 130 processes the object identification according to the application scenario.

Figure 9:
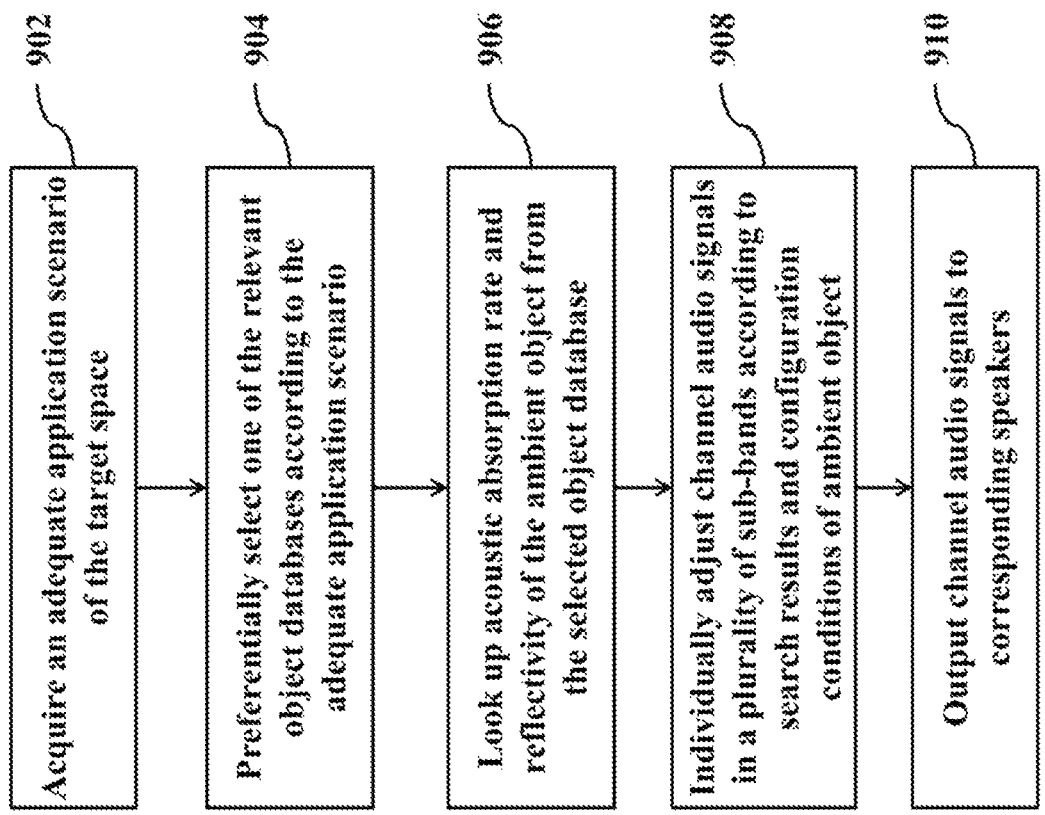
FIG. 9 is a flowchart of object identification by the host device according to one embodiment of the present invention.

FIG. 9 is a flowchart of the host device 130 identifying the object according to an embodiment of the present invention. The ambient objects 175 that appear in different application scenarios often have significant ethnic affinity for their acoustic properties, and the coefficient of sound field reflection caused by the surrounding environment material or room size is also different. Therefore, distinguishing the application scenario in advance, helps the audio system 100 to improve the efficiency of sound field optimization. It will be appreciated that each process in FIG. 9 performed by the host device 130, is not limited to a single circuit or module in it, which may also be a coordinated operation of a plurality of circuits.

In operation 902, the host device 130 acquires an adequate application scenario of the target space 170. The host device 130 may obtain the adequate application scenario in several diverse ways. In one embodiment, the recognizer circuit 134 in the host device 130 may identify the field context information provided by the sensor circuit 140, and determine the adequate application scenario according to the field context information. In another embodiment, the control circuit 132 of the host device 130 obtains spatial configuration information of the ambient object by running a configuration program through the user interface circuit 133, and also obtains the application scenario defined by the user 180 through the configuration program. In a further derived embodiment, the control circuit 132 in the host device 130 may acquire relevant information of the adequate application scenario from a user device 150 by means of a communication circuit 136.

In operation 904, to accelerate the query of ambient objects and improve the accuracy, the host device 130 preferentially selects one of the relevant object databases according to the adequate application scenario. The object databases are typically pre-built collections of data that can be provided from a number of various sources. For example, the storage circuit 131 in the host device 130 may provisionally store one or more object databases corresponding to different application scenarios. In another embodiment, the host device 130 may be connected to a remote database 160 using a communication circuit 136. The remote database 160 may contain a plurality of object databases corresponding to different application scenarios. Each object database contains information about the appearance characteristics of multiple ambient objects 175, as well as acoustic attribute information.

When the host device 130 obtains an application scenario in the operation 902, an object database may be preferentially selected from the storage circuit 131 or the remote database 160 best suitable for the application scenario to perform subsequent identification of ambient objects. In one embodiment, the recognizer circuit 134 analyzes the field context information provided by the sensor circuit 140 to obtain one or more object appearance characteristic information, and looks up the object database according to the object appearance characteristic information. An ambient object in line with the object appearance characteristic information may be identified, comprising the name, acoustic absorption rate, and reflectivity of sound. In another embodiment, the control circuit 132 executes a configuration program, using a user interface circuit 133 to obtain the name of an ambient object. The control circuit 132 looks up the object database according to the name of the ambient object 175 to obtain the corresponding acoustic absorption rate and reflectivity of sound corresponding to the ambient object.

In a further derived embodiment, the parameters used in the process of finding may be multi-variably combined. For example, when the recognizer circuit 134 analyzes the field context information, the ambient object 175 may obtain the material, size, shape and other appearance features. The recognizer circuit 134 transmits the appearance feature information to the object database for multi-condition cross-comparison, and obtains a list of candidates sorted according to the matching score. If the application scenario information is used together in the process of finding the object database, the search process can be effectively narrowed down to accelerate the recognition, and improve the correctness.

In operation 906, the control circuit 132 looks up the acoustic absorption rate and reflectivity sound corresponding the ambient object from the object database selected in operation 904. In practice, the acoustic attribute information of ambient objects stored in the object database is not limited to being stored in multiple independent object databases. An object database can be a correlational database that contains a variety of fields connected together in the form of correlation coefficients. For example, the fields of an object database can contain object names, application categories, materials, acoustic absorption rates, reflectivity of sound, and even appearance features such as shape, color, gloss, and so on. The field value corresponding to each ambient object 175 is not limited to a one-to-one relationship, but can be one-to-many, or many-to-one. The value stored in each field is not necessarily an absolute value, but a range value or probability value. In a further derived implementation, the object database may be an adaptive database that can be machine learned and constantly iteratively corrected. The user 180 may feedback the preference settings through the user interface circuit 133 and train the object database.

In operation 908, the control circuit 132 individually adjusts each of the channel audio signals in a plurality of sub-bands according to search results and configuration conditions of the ambient object. The acoustic properties of the ambient object 175, may be significantly varied in different sub-bands. For example, a sofa may absorb a large number of high-frequency signals, but does not affect the penetration of low-frequency signals. Therefore, the acoustic absorption rate or reflectivity of sound found from the object database can be an array value corresponding to multiple sub-bands, or a frequency response curve. Regarding the bandwidth or segmentation of each sub-band, it may vary with the design requirements, and is not limited in the embodiment. The adjustment performed by the control circuit 132 to adjust the gain value of the channel audio signal in a plurality of sub-bands, may be simulated as an equalizer or filter concept in practice. In other words, the control circuit 132 may be a first-class equalizer for each speaker in the audio system 100, and the output compensation value calculated according to the foregoing embodiment is customized into the equalizer, allowing the corresponding channel audio signal to be adjusted. Further embodiments for calculating the output compensation value will be illustrated in FIG. 10.

In operation 910, the control circuit 132 transmits adjusted audio signals to corresponding speakers through the audio transmission circuit 135. An embodiment of the audio transmission circuit 135 is described in FIG. 1 and will not be repeated herein.

The embodiment of FIG. 9 highlights the following advantages. The object recognition can be performed with reference to the application scenario (automatic recognition or manual input) to increase identification efficiency. The object database adopts an extensible architecture to continuously enhance recognition capabilities in the long term under the lifecycle of big data services and machine learning in the cloud. The sound system 100 may apply the concept of equalizers to divide the channel audio signal into multiple sub-bands for separate process, so that the final synthesized sound quality is effectively improved.

Figure 10:
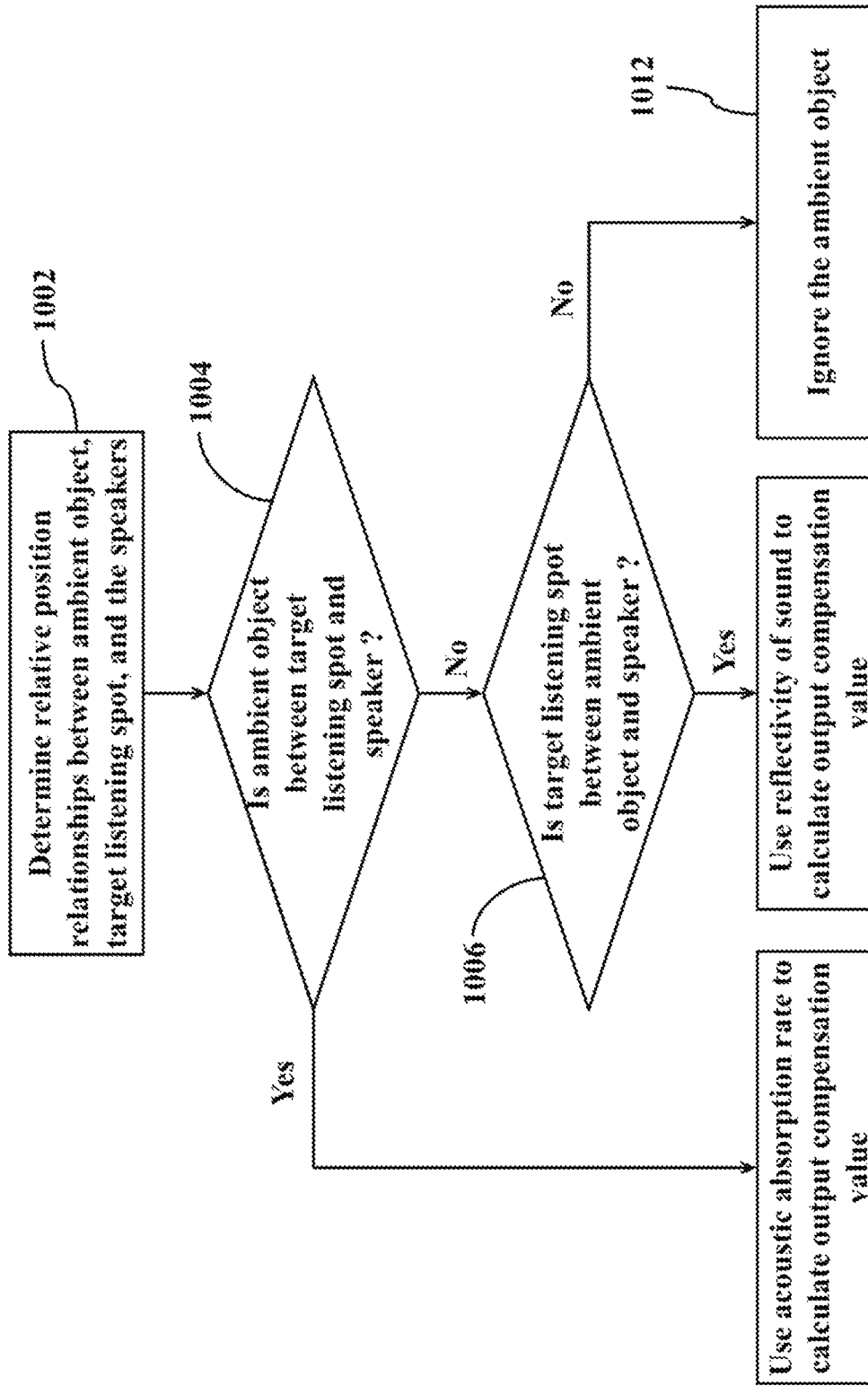
FIG. 10 is a flowchart of audio processing according to an embodiment of the invention, which describes the calculation of an output compensation value according to the position of the ambient object.

The following description further illustrates in FIG. 10 how the control circuit 132 calculates the output compensation value of each channel according to the spatial configuration information of the ambient object 175.

FIG. 10 is a flowchart of an audio processing method according to an embodiment of the invention, explaining how to calculate the output compensation value based on position relationships between ambient objects. The processes in FIG. 10 are mainly performed by the control circuit 132 in the host device 130.

In operation 1002, the control circuit 132 determines a relative position relationship between the ambient object, the target listening spot, and the speakers. A plurality of speakers and a plurality of ambient objects 175 in the target space 170, may be arranged with the target listening spot to form a plurality of sets of position relationships. Each set of positional relationships corresponds to a speaker, an ambient object 175, and a target listening spot. The control circuit 132 examines and evaluates each set of positional relationships in the target space 170 and calculates the corresponding output compensation value. The following description takes one of the position relationships in the audio system 100 as an example, to explain how the control circuit 132 compensates for to a speaker interference at the target listening spot caused by an ambient object 175

In operation 1004, the control circuit 132 determines whether the ambient object 175 is between the target listening spot and the speaker. The position of the ambient object 175 in the target space 170 may also be obtained by the recognizer circuit 134, or by the user interface circuit 133 controlled by a configuration program. After the control circuit 132 synthesizes the above information, a relative position relationship composed of an ambient object 175, a target listening spot, and a speaker is determined, and a corresponding compensation is conducted on each speaker output. Process 1004 shows the situation to be determined as FIG. 7. If the situation is met, operation 1008 is conducted. If the situation is not met, operation 1006 is conducted.

In operation 1006, the control circuit 132 determines whether the target listening spot is located in the middle of the ambient object 175 and the speaker. The situation to be determined by operation 1006 is shown as FIG. 8. If the situation is met, operation 1010 is conducted. If the situation is not met, operation 1012 is conducted.

In operation 1008, the control circuit 132 uses the acoustic absorption rate of the ambient object 175 to calculate the output compensation value of the channel audio signal. In a preferred embodiment, the output compensation value of the channel audio signal from a speaker is divided into a plurality of sub-bands for separated calculation. Detailed calculations may refer to the target space 700 of FIG. 7 and the formula (8). The control circuit 132 may look up the acoustic absorption rate of the ambient object 175 from an object database, and substitute it into equation (8) to obtain the output compensation value.

In operation 1010, the control circuit 132 uses the reflectivity of sound corresponding to the ambient object 175 to calculate the output compensation value of the channel audio signal. Referring to the target space 800 of FIG. 8 and equation (8), the control circuit 132 may look up the reflectivity of sound corresponding to the ambient object 175 from the object database, and substitute it into equation (8) to obtain an output compensation value.

It is understandable that the output compensation value calculated according to the acoustic absorption rate of the ambient object 175 may amplify the gain value, the sound pressure level, or the equal loudness of the adjusted channel audio signal to compensate for the energy absorbed. Conversely, the output compensation value calculated according to the reflectivity of sound corresponding to the ambient object 175 may reduce the gain value, the sound pressure level, or the equal loudness of the adjusted channel audio signal to balance the energy reflected back. In other words, the output compensation values calculated based on the acoustic absorption rate are usually polarly opposite that calculated from the reflectivity of sound.

In operation 1012, if the ambient object 175 does not meet the conditions of operation 1004 and operation 1006, the control circuit 132 may determine the ambient object 175 in a position that will not affect the speaker to the target listening spot playback. In that case, the control circuit 132 may ignore the effect of the ambient object 175 imposed on the speaker and the target listening spot. However, it is to be understood that a target space 170 typically contains a plurality of speakers. The ambient object 175 does not affect one of the speakers to the target listening spot, but may still affect another speaker. In other words, the control circuit 132 needs to individually perform processes of FIG. 10 for each set of the positional relationships in the target space 170.

In some specific cases, the presence of the ambient object 175 may be directly ignored. For example, if the sound reflected or absorbed by the ambient object 175 is less than a particular threshold, the presence of the ambient object 175 in the target space 170 may be ignored. On the other hand, if the control circuit 132 determines that the volume of the ambient object 175 is less than a particular size, the presence of the ambient object 175 may also be ignored.

In a further derived embodiment, if more than one user is detected in the target space 170, the target listening spot may be determined to be a position center point of the plurality of users, or selectively based on the location of one of the users. As for the other users not elected as the target listening spot, the host device 130 may take them as ambient objects and accordingly apply the embodiments of FIGS. 7 to 8.

The embodiment of FIG. 10 highlights the following advantages. The embodiment of FIG. 10 follows the processes in FIGS. 7 and 8, to simplify the complex environmental problem into a plurality of linear relationship problems that can be solved separately. For some particular cases, the ambient object 175 may also be ignored to simplify the complexity of the calculation.

Figure 11:
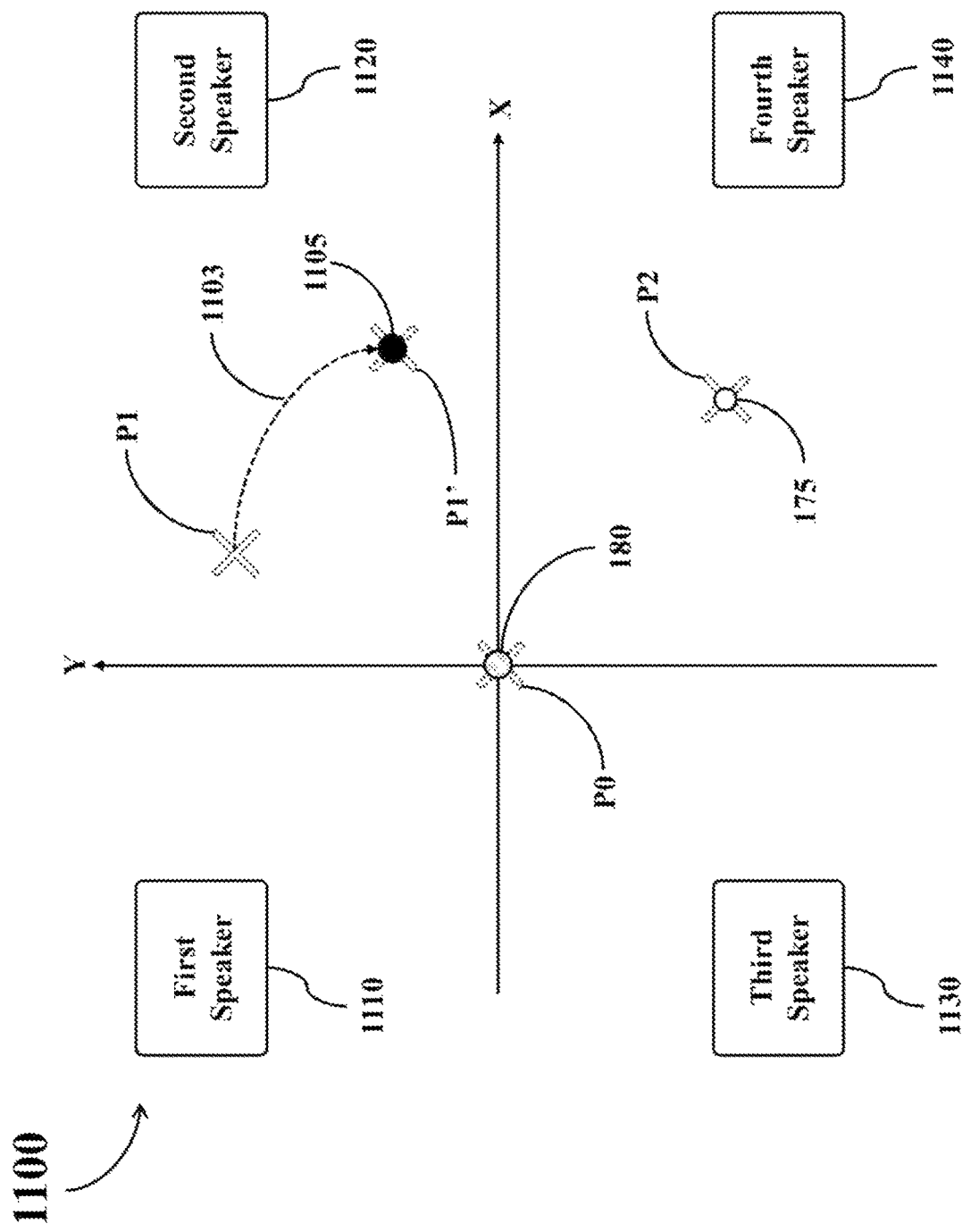
FIG. 11 shows a schematic view of a target space of the present invention, for illustrating an embodiment of an optimized sound field with object-based compensation operation.

FIG. 11 is a schematic diagram of a target space of the present invention 1100 for illustrating an embodiment of optimizing the sound field by performing an object-based compensation.

In the target space 1100, there are multiple speakers, such as a first speaker 1110, a second speaker 1120, a third speaker 1130 and a fourth speaker 1140. In the case where the audio system 100 operates based on the object-based compensation operation, the control circuit 132 logically treats the target space 1100 as a coordinate system. The spatial coordinate can be a two-dimensional planar coordinate or a three-dimensional Cartesian coordinate. For ease of illustration, FIG. 11 illustrates the description in a way that comprises a two-dimensional plane coordinate of an X axis and a Y axis.

In the target space 1100, the user 180 is located at the origin P0. The control circuit 132 assigns the location of the user 180 to be the target listening spot. As described in the embodiment of FIG. 3, the object-based acoustic system is based on a large number of acoustic parameters matrix calculation. Each source object has metadata for describing properties of the source object, such as type, position, size (length, width, height), divergence, and so on. After the object-based operation, the sound presented by a source object is assigned to one or more speakers to be jointly played. Each speaker may respectively play a proportion of the sound of the source object. In other words, the object-based acoustic system can utilize multiple speakers to simulate the physical presence of a sole source object. For example, through the object-based compensation operation, the user 180 at the target listening spot, can hear a virtual audio object 1105 along the movement trajectory 1103 from the first location P1 to the new first location P1'.

The object-based compensation operation of the embodiment may optimize all speaker output channel audio signal experienced at the target listening spot. The Object-based compensation operation utilizes array arithmetic modules in existing object-based acoustic systems to parameterize various distance factors and sound field categories, and can perform operations similar to equations (4) to (7). For the audio system 100, the host device 130 only needs to apply the position information of the user 180 to the object-based compensation operation, and thereby the channel audio signal output from all speakers can be optimized from the perspective of the target listening spot.

In one embodiment, the control circuit 132 may define a target listening spot as the origin of the entire spatial coordinate system. When the user 180 moves, the entire spatial coordinate system moves with the origin. In other words, the position of the virtual audio object 1105 relative to the origin remains unchanged. When the control circuit 132 plays the effect of the virtual audio object 1105 through the object-based compensation operation, the relative position of the virtual sound source object 1105 felt by the user 180 will not change with the movement of the user 180.

In the target space of the embodiment 1100, there may exist an ambient object 175 having a substantial impact on the listening experience for the user 180. The control circuit 132 may obtain the spatial configuration information of the ambient object in the target space 1100 through the operation 902 of FIG. 9, wherein the location of the ambient object 175 is determined to be at the second location P2. When the user 180 moves, the origin of the entire spatial coordinate system changes with the user 180. Although the ambient object 175 does not move, the relative position of the origin changes. It is therefore understandable that in the space coordinate system after the movement of the user 180, the coordinate value of the ambient object 175 is moved in the opposite direction.

To cancel the interference generated by the ambient object 175 on the user 180, the control circuit 132 of the embodiment creates an object-based compensatory audio object according to the ambient object 175. The metadata of the compensatory audio object comprises: the coordinate of the ambient object 175, the size, the reflectivity of sound, and the acoustic absorption rate. The reflectivity of sound and the acoustic absorption rate of the ambient object 175 may be obtained in operation 906 of FIG. 9. The compensatory audio object is regarded as a negative source object of the ambient object 175 and is applied to the object-based compensation operation to become a virtual sound source that can cancel the ambient object 175.

It is understandable that the essence of the compensatory audio object is the negative source object corresponding to the ambient object 175, the position of which overlaps with the ambient object 175, so it is not otherwise illustrated in FIG. 11. Furthermore, the four-speaker configuration of the target space 1100 is just an example. In practical applications of the audio system 100, the number of speakers may have a lot more varieties, including the 3D case wherein upper speakers and lower speakers are deployed. The description is not intended to limit any other possible configurations.

The embodiment of FIG. 11 illustrates the advantages of the object-based compensation operation. The control circuit 132 converts the information of the target space 1100 into the form of a spatial coordinate system, which may simplify the complex multi-object interaction calculation into a matrix calculation of metadata. The position of the user 180 in motion is set to the origin of the spatial coordinate system, so that the processing of the virtual object is completely unaffected by the movement of the user 180, and the operation process is simplified. The embodiment also proposes the concept of compensating the sound source object, directly applying the object-based compensation operation to offset the interference of the ambient object, thereby eliminating the need for complex multi-channel interaction operations.

Figure 12:
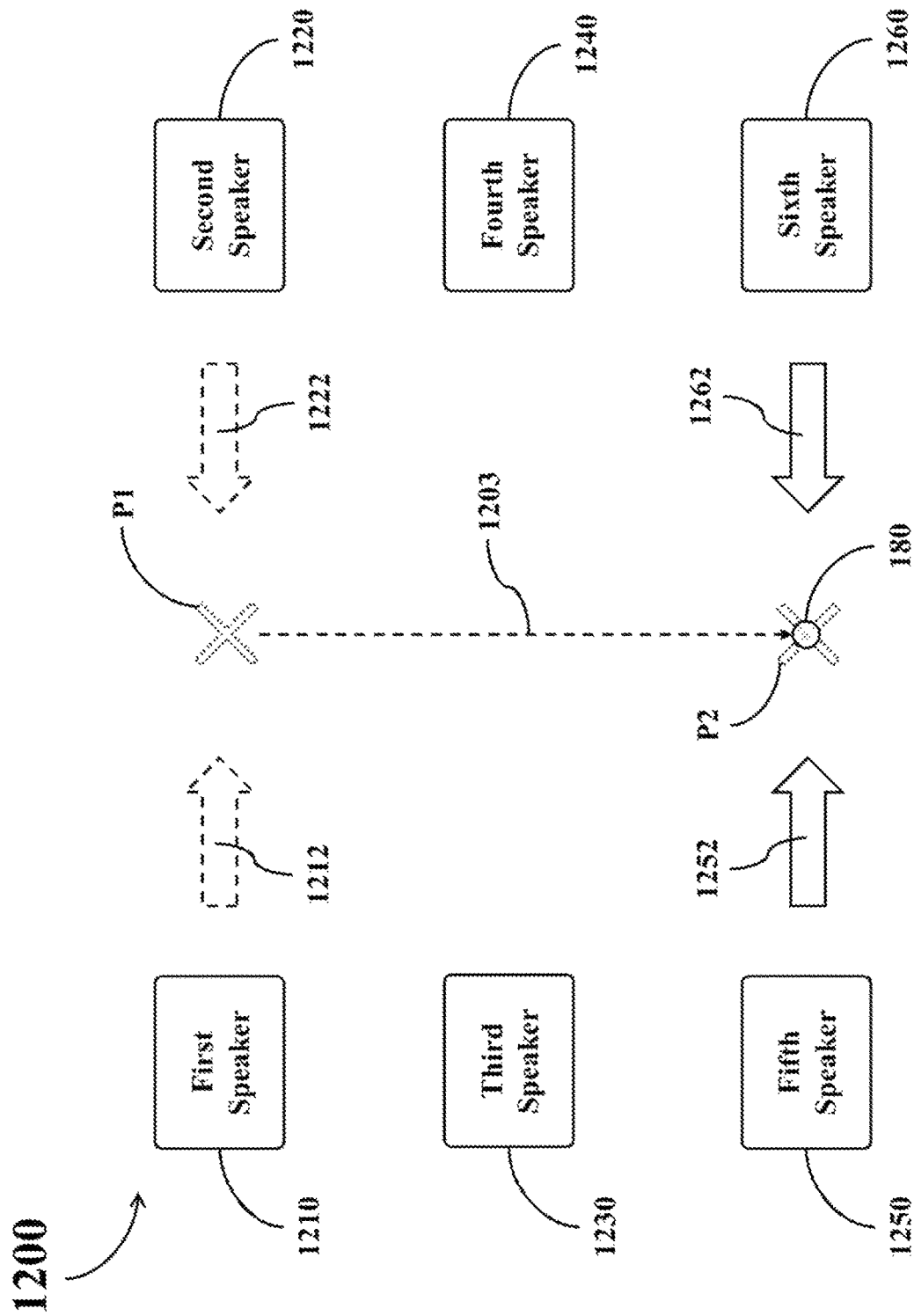
FIG. 12 shows a schematic view of a target space according to an embodiment of the present invention, illustrating a sound field optimization based on an object-based compensation operation.

The following description explains in FIG. 12 the simplicity of the object-based compensation operation and possible derivative applications.

FIG. 12 is a schematic diagram of a target space of the present invention 1200 for illustrating an embodiment of an optimized sound field operating on an object-based compensation.

The target space 1200 may contain a plurality of speakers, such as the first speaker 1210, the second speaker 1220, the third speaker 1230, the fourth speaker 1240, the fifth speaker 1250 and the sixth speaker 1260, arranged as a long bar sound field. Each speaker corresponds to an ID. When the user 180 is located in the first location P1, the data in a virtual audio object (not shown) is mapped to the ID of the first speaker 1210 and the second speaker 1220. After the control circuit 132 performs the object-based compensation operation, the first speaker 1210 and the second speaker 1220 play the first channel output 1212 and the second channel output 1222, so that the user 180 feels the existence of the virtual audio object. When the user 180 moves along the movement trajectory 1203 to the second location P2, the control circuit 132 is recalculated by the target listening spot, the data in the virtual audio object is mapped to the fifth speaker 1250 and the sixth speaker 1260. After the control circuit 132 performs the object-based compensation operation, the fifth speaker 1250 and the fifth speaker 1250 play the fifth channel output 1252 and the sixth channel output 1262, so that the user 180 feels that the virtual audio object still exists around the user 180, and does not leave with the movement of the user 180.

The embodiment mainly illustrates the flexible application and simplicity of the object-based compensation operation. In many exceptional cases, only a small amount of computation is required to optimize the sound field. For example, if the user 180 is located in a spherical sound field, the control circuit 132 only needs to perform the calculation of rotation coordinates, allowing the user 180 to experience consistent sound field effect when facing various directions.

Figure 13:
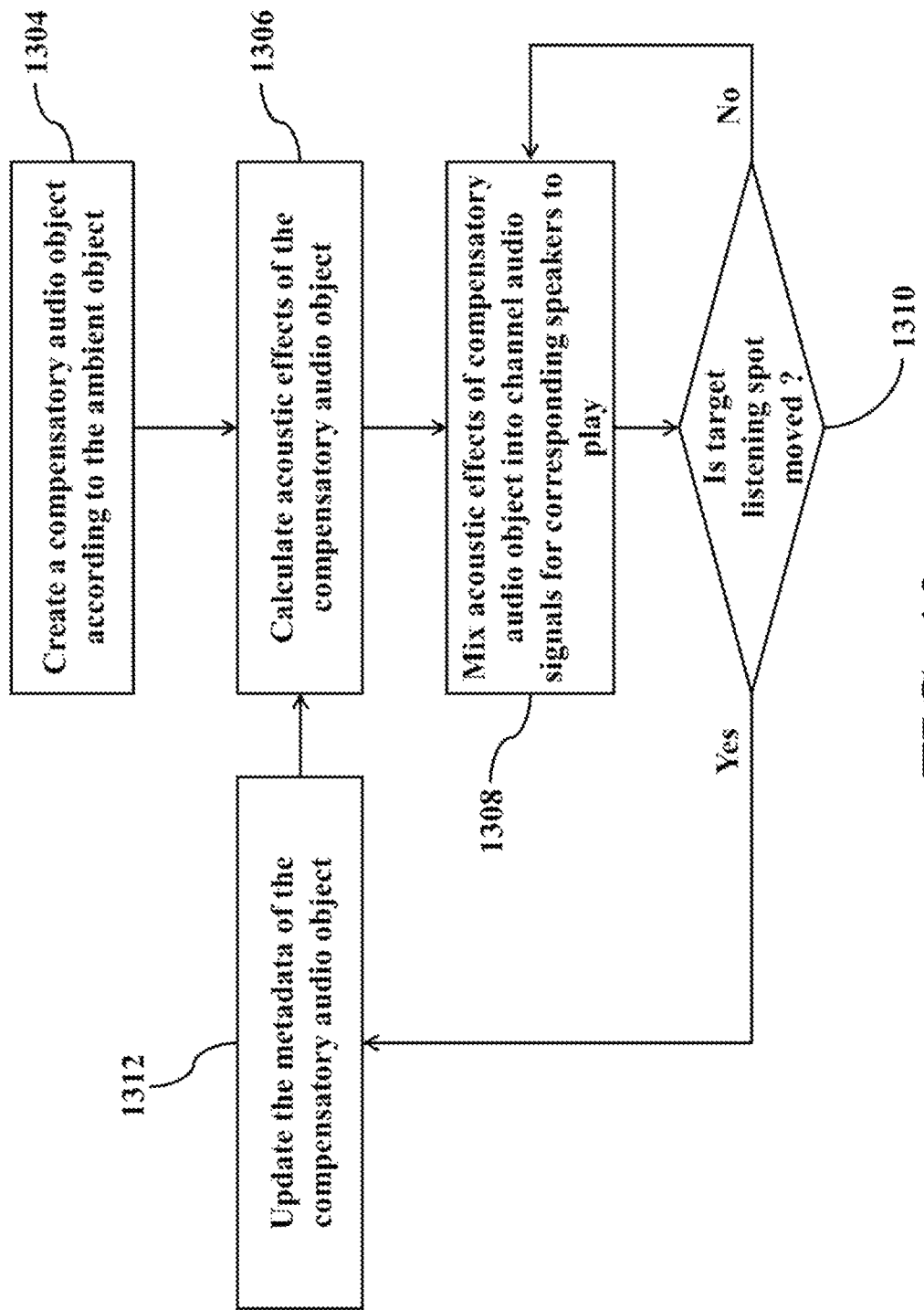
FIG. 13 is a flowchart of an object-based compensation operation according to an embodiment of the present invention.

The following description summarizes in FIG. 13 the fundamental logic of the control circuit 132 when performing the object-based compensation operation.

FIG. 13 is a flowchart of an object-based compensation operation according to an embodiment of the present invention, illustrating the concept of creating a compensatory audio object.

In operation 1304, the control circuit 132 creates a corresponding compensatory audio object according to the ambient object 175. For the user 180 located at the target listening spot, the presence of an ambient object 175 is a physical sound source. The ambient object 175 may reflect the sound emitted by a speaker to the target listening spot. The ambient object 175 may also block or absorb a portion of the sound, so that the sound emitted from the speaker to the target listening spot is attenuated. The compensatory audio object is a negative sound source object created for the ambient object 175. When the host device 130 substitutes the compensatory audio object into the object-based compensation operation to produce channel audio signal, the presence of the ambient object 175 is cancelled. The specific details of the object-based operation itself can be extended to the calculation method of the existing object-based acoustic product, using the metadata of the sound source object to perform a large number of related matrix calculations. For example, one of the data of the compensatory audio object comprises: the coordinate of the ambient object 175, the size, the reflectivity of sound, and the acoustic absorption rate.

In operation 1306, the control circuit 132 calculates the acoustic effect of the compensatory audio object. In the embodiment, the compensatory audio object is correspondingly created according to the ambient object 175, wherein the data has the same coordinate position as the ambient object 175, the size, the reflectivity of sound, and the acoustic absorption rate, which renders inverted sound source effects that cancels the gain value of the ambient object 175.

The embodiment of FIG. 13 may also apply the calculations of FIGS. 7 and 8. Equation (8) may further be derived into Equation (9), calculating a passively generated gain value of the ambient object 175 according to the sound pressure level generated by the first speaker 110 and imposed on the ambient object 175:

$$At[m][n]=R[n]*SPLt[m] \quad (9)$$

Wherein, m represents the speaker number, n represents the number of the sub-bands. At[m][n] represents the gain value produced by the influence of the n-th sub-band by the m-th speaker. R[n] represents the acoustic absorption rate of the n-th sub-band. SPLt[m] represents the sound pressure level of the ambient object 175 received at the time point t from the m-th speaker. The time point t may represent the time difference in which the sound is transmitted from the speaker to the ambient object 175. If the time difference is greater than a non-negligible range, it means that there is an echo condition in the target space 170.

From Equation (9) it can be seen that the calculation results of each ambient object, essentially comprise a gain value array corresponding to a plurality of speakers and a plurality of sub-bands at a time point. The acoustic effect of the compensatory audio object is the negative value of the gain value array. That is, the object-based compensation operation based on Equation (9) contains matrix calculations of interactively arranged parameters in multiple dimensions. For illustrative purposes, the gain values corresponding to one of the speakers and one of its sub-bands at a time point are illustrated below.

The embodiment of FIG. 13 is similar to the embodiments of FIGS. 7 and 8, which may be based on the spatial configuration information of the ambient object 175 to correspondingly calculate the acoustic influence of the ambient object using an appropriate calculation method. For example, if the target listening spot is located between a speaker and the ambient object 175 of the line of sight, the control circuit 132 calculates the acoustic effect of the compensatory audio object according to the reflectivity of sound corresponding to the ambient object 175. In contrast, if the ambient object 175 is located between the target listening spot and the speaker's line of sight, the control circuit 132 calculates the acoustic effect of the compensatory audio object according to the acoustic absorption rate of the ambient object 175.

For example, when an ambient object 175 absorbs the sound emitted by a speaker, the loudness effect received by the target listening spot is reduced. Meanwhile, the control circuit 132 creates a virtual sound source object that will produce a corresponding loudness effect on the coordinate of the ambient object 175 as compensation. In contrast, if an ambient object 175 reflects the sound of a speaker, so that the target listening spot receives too much loudness. In that case, the control circuit 132 creates at the coordinate of the ambient object 175 a virtual audio object having a negative gain value.

It is understandable that the line of sight is defined as a straight line of two objects in space. Physical objects have a certain volume and area, wherein the volume can be so large that partially or totally occludes the line of sight. The embodiment may be based on Equation (9), and further weight coefficients or different offset corrections may be included in the equations depending on practical scenario.

In operation 1308, the control circuit 132 mixes the acoustic effect of the compensatory audio object into the channel audio signal, to be played by corresponding speakers. The object-based compensation operation performed by the control circuit 132 may manage complex matrix calculations corresponding to objects, wherein each speaker is assigned to play a corresponding one-channel audio signal synthesized from a plurality of audio source signals. After applying the object-based compensation, the listening experience received at the target listening spot comprises the source effect produced by the compensatory audio object. Thus, the interference caused by the ambient object 175 may be effectively cancelled by the compensatory audio object.

In the operation 1310, the control circuit 132 determines whether the target listening spot is moved to a new position. As described in operation 208, the audio system 100 continuously tracks the movement of the user 180 and updates the target listening spot. If the target listening spot has moved, the operation 1312 is performed. Otherwise, the playback operation of operation 1308 continues.

In the operation 1312, the control circuit 132 updates the metadata of the compensatory audio object. In the embodiment, the control circuit 132 will establish an object-based space with the target listening spot as an origin. If the target listening spot moves to a new position, the control circuit 132 assigns the new position to the new origin of the object-based space. The difference between the new origin and the origin coordinate can be expressed as an offset vector. The spatial coordinate value of the ambient object 175 relative to the target listening spot will also change inversely with the movement vector. The control circuit 132 then updates the metadata of the compensatory audio object corresponding to the ambient object 175 according to the offset vector. In a further embodiment, all speakers in the object-based space may also be regarded as objects, having a corresponding ID, metadata and coordinate values.

In another embodiment, the audio system 100 is not limited to using the target listening spot as the origin. The audio system 100 may also employ a fixed reference point as the origin of the object-based space. When the source object in the object-based space appears relative position changes, the control circuit 132 correspondingly updates the coordinate values in the source object's metadata.

When operation 1312 is completed, the control circuit 132 repeats operation 1308.

The embodiment of FIG. 13 illustrates the advantages of the object-based compensation operation. The control circuit 132 converts the information of the target space 1100 into the form of a spatial coordinate system, which may simplify the complex multi-object interaction calculation into a matrix calculation of metadata. The position of the user 180 in motion is set to the origin of the spatial coordinate system, so that the processing of the virtual object is completely unaffected by the movement of the user 180, and the operation process is simplified. The embodiment also proposes the concept of compensating the sound source object, directly applying the object-based compensation operation to cancel the interference of the ambient object, eliminating the need for complex multi-channel interaction operations.

In a further derived embodiment, if the host device 130 is not capable of performing the object-based audio synthesizing, the control circuit 132 may provide a channel mapping function by executing the software, so that the operation result of the object-based can be correctly corresponded to each speaker.

In summary, the present application proposes an audio system 100, which can dynamically track the user's position and optimize the sound field, and intelligently eliminate interference caused by ambient objects. The means for tracking the user's location may be implemented by a variety of separate applications or combinations of cameras, infrared, or wireless detectors. The spatial configuration information of the ambient object 175 in the target space 170 may be obtained by the image captured by the camera after identification, or it may be manually entered by the user. The sound field can be optimized by the channel-based compensation operation or the object-based compensation operation. When calculating the influence of the ambient object 175 on the target listening spot, the relative position relationship between the ambient object 175 and the speaker and the target listening spot may also be considered, so that different calculation methods can be adopted. When using the object-based compensation operation, the control circuit 132 creates a corresponding compensatory audio object for each ambient object 175, so that the channel audio signal rendered by audio mixing cancels the interference caused by the ambient object 175 at the target listening spot.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An audio system (100) arranged to dynamically optimize playback effects according to a user position, comprising:
 a sensor circuit (140), arranged to dynamically sense a target space (170) to generate field context information;
 a first speaker (110) and a second speaker (120), arranged to play sound;
 a host device (130), coupled to the sensor circuit (140), the first speaker (110) and the second speaker (120), comprising:
  a recognizer circuit (134), arranged to identify a user from the field context information and determine the user position in the target space (170);
  a control circuit (132), coupled to the recognizer circuit (134), arranged to dynamically assign the user position as a target listening spot; and
  an audio transmission circuit (135), coupled to the control circuit (132), the first speaker (110) and the second speaker (120), arranged to transmit audio signals;
 wherein, the sensor circuit (140) comprises a camera (610), arranged to capture an ambient image of the target space (170);
 wherein, the recognizer circuit (134) analyzes the ambient image to obtain spatial configuration information and acoustic attribute information of an ambient object (175) in the target space (170);
 wherein, the control circuit (132) performs a channel-based compensation operation based on the target listening spot, the spatial configuration information, and the acoustic attribute information of the ambient object (175), to render a first channel audio signal (112) and a second channel audio signal (122) optimized for the target listening spot; and
 wherein, the control circuit (132) respectively outputs the first channel audio signal (112) and the second channel audio signal (122) through the audio transmission circuit (135) to the first speaker (110) and the second speaker (120);
 wherein the channel-based compensation operation comprises:
 subdividing the first channel audio signal (112) output by the first speaker (110) into a plurality of sub-band signals;
 determining whether a sound field type that one of the sub-band signals imposes on the target listening spot belongs to a near filed or a far field based on a wavelength of the sub-band signal, and a distance between the target listening spot and the first speaker (110),
 wherein the distance between the target listening spot and the first speaker (110) is greater than a specific proportion of the wavelength of the sub-band signal or a size of the first speaker (110), deeming the second field type to be the far field; and
 when the distance between the target listening spot and the first speaker (110) is less than the specific proportion of the wavelength of the sub-based signal or a size of the first speaker (110), deeming the sound field type to be the near field.

2. The audio system (100) of claim 1, wherein the channel-based compensation operation further comprises, when the control circuit (132) determines a distance between the target listening spot and the first speaker (110) is changed from a first distance (R1) to a second distance (R2), and the sound field type belongs to the far field, the audio system (100) uses a far field formula to calculate a sound pressure level of the sub-band signal;
 wherein, the far field formula comprises:

$$SPL' = SPL + 20 \log_{10}(R2/R1)$$

wherein, SPL is the sound pressure level of the sub-band signal before adjustment, SPL' is the sound pressure level of the sub-band signal after adjustment, R1 is the first distance, R2 is the second distance; and wherein, if the sound pressure level of the sub-band signal after adjustment is less than zero, the control circuit (132) mandates the sound pressure level of the sub-band signal to zero.

3. The audio system (100) of claim 2, wherein the channel-based compensation operation further comprises, when the control circuit (132) determines a distance between the target listening spot and the first speaker (110) is changed from a first distance (R1) to a second distance (R2), and the sound field type belongs to the near field, the audio system (100) uses a near field formula to calculate a sound pressure level of the sub-band signal;

wherein, the near-field formula comprises:

$$SPL' = SPL + 10 \log_{10}(R2/R1)$$

wherein, SPL is the sound pressure level of the sub-band signal before adjustment, SPL' is the sound pressure level of the sub-band signal after adjustment, R1 is the first distance, R2 is the second distance; and wherein, if the sound pressure level of the sub-band signal after adjustment is less than zero, the control circuit (132) mandates the sound pressure level of the sub-band signal to zero.

4. The audio system (100) of claim 1, wherein the spatial configuration information of the ambient object (175) comprises position, size and appearance characteristics of the ambient object (175), and the acoustic attribute information of the ambient object (175) comprises a reflectivity of sound and an acoustic absorption rate;

wherein, when the control circuit (132) generates the first channel audio (112), if the target listening spot is in a line of sight between the first speaker (110) and the ambient object (175), the control circuit (132) uses the reflectivity of sound corresponding to the ambient object (175) to calculate a playback effect on the target listening spot that is played by the first speaker (110) and affected by the ambient object (175), to determines the sound pressure level of the first channel audio signal (112); and wherein, when the control circuit (132) generates the first channel audio (112), if the ambient object (175) is in a line of sight between the target listening spot and the first speaker (110), the control circuit (132) uses the acoustic absorption rate of the first speaker (110) to calculate the playback effect on the target listening spot that is played by the first speaker (110) and affected by the ambient object (175), to determine the sound pressure level of the first channel audio signal (112).

5. The audio system (100) of claim 1, wherein the recognizer circuit (134) dynamically identifies the user's head position, face orientation, or ear position according to the ambient image captured by the camera (610), to determine the user position.

6. The audio system (100) of claim 1, wherein the sensor circuit (140) further comprises an infrared sensor (620) arranged to capture a thermal image in the target space; and the recognizer circuit (134) analyzes a movement trajectory of the thermal image to dynamically determine the user position.

7. The audio system (100) of claim 1, wherein the sensor circuit (140) further comprises a wireless detector (630) disposed in the target space to operably detect a wireless signal of an electronic device;

wherein, the recognizer circuit (134) uses characteristics of the wireless signal detected by the wireless sensor (630) to dynamically locate the position of the electronic device; and wherein, the recognizer circuit (134) dynamically determines the user position according to the position of the electronic device.

8. The audio system (100) of claim 1, wherein the host device (130) further comprises a storage circuit (131) coupled to the control circuit (132), arranged to operably store one or more object databases, wherein each of the object databases corresponds to one of a plurality of application scenarios, and comprises appearance characteristics and acoustic attribute information of a plurality of ambient objects;

wherein, when the recognizer circuit (134) analyzes the field context information, the recognizer circuit (134) identifies the field context information and determines an adequate application scenario correspondingly; and wherein, the control circuit (132) selects from the storage circuit (131) an object database preferentially associated to the adequate application scenario, as a basis to identify the ambient object and find the acoustic attribute information of the ambient object.

9. The audio system (100) of claim 1, wherein the host device (130) further comprises a communication circuit (136) coupled to the control circuit (132), controlled by the control circuit (132) to be operably coupled to a remote database (160) corresponding to the application scenario;

wherein the remote database (160) is arranged to operably store one or more object databases, wherein each of the object databases corresponds to one of a plurality of application scenarios, and comprises appearance characteristics and acoustic attribute information of a plurality of ambient objects;

wherein, when the recognizer circuit (134) analyzes the field context information, the recognizer circuit (134) identifies the field context information and determines an adequate application scenario correspondingly; and wherein, the control circuit (132) selects from the remote database (160) an object database preferentially associated to the adequate application scenario, as a basis to identify the ambient object and find the acoustic attribute information of the ambient object.

* * * * *